US010555306B2

(12) United States Patent
Jung et al.

(10) Patent No.: US 10,555,306 B2
(45) Date of Patent: *Feb. 4, 2020

(54) DEVICE-TO-DEVICE (D2D) OPERATION METHOD PERFORMED BY TERMINAL IN WIRELESS COMMUNICATIONS SYSTEM AND TERMINAL USING SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,832

(22) Filed: May 8, 2019

(65) Prior Publication Data
US 2019/0268908 A1    Aug. 29, 2019

Related U.S. Application Data

(63) Continuation of application No. 15/329,132, filed as application No. PCT/KR2015/008315 on Aug. 7, 2015, now Pat. No. 10,327,243.

(60) Provisional application No. 62/034,753, filed on Aug. 7, 2014.

(51) Int. Cl.
*H04W 72/04* (2009.01)
*H04W 72/02* (2009.01)
*H04W 76/14* (2018.01)

(52) U.S. Cl.
CPC ....... *H04W 72/0453* (2013.01); *H04W 72/02* (2013.01); *H04W 72/04* (2013.01); *H04W 72/042* (2013.01); *H04W 72/0413* (2013.01); *H04W 76/14* (2018.02)

(58) Field of Classification Search
CPC ............. H04W 72/04; H04W 72/0453; H04W 72/0413; H04W 72/042; H04W 76/14; H04W 72/02
See application file for complete search history.

(56) References Cited

U.S. PATENT DOCUMENTS

| 9,867,186 | B2 | 1/2018 | Xu ..................... H04W 76/14 |
| 2013/0272262 | A1 | 10/2013 | Li et al. |
| 2014/0092885 | A1 | 4/2014 | Venkatachalam et al. |
| 2014/0094122 | A1 | 4/2014 | Etemad et al. |

(Continued)

FOREIGN PATENT DOCUMENTS

| CN | 103843444 A | 6/2014 |
| EP | 2892258 A1 | 7/2015 |

(Continued)

OTHER PUBLICATIONS

Kyocera, "Inter-frequency discovery considerations", 3GPP TSG-RAN WG2 #86, May 19-23, 2014, R2-142240.

(Continued)

*Primary Examiner* — Gbemileke J Onamuti
(74) *Attorney, Agent, or Firm* — Dentons US LLP

(57) ABSTRACT

Provided are a device-to-device (D2D) operation method performed by a terminal in a wireless communications system and a terminal using the same. The method comprises receiving a D2D setting from a cell, wherein the D2D setting comprises a frequency indicator indicating a frequency at which a terminal performs a D2D operation according to the D2D setting.

8 Claims, 22 Drawing Sheets

(56) References Cited

U.S. PATENT DOCUMENTS

| | | |
|---|---|---|
| 2014/0094183 A1 | 4/2014 | Gao et al. |
| 2014/0204847 A1 | 7/2014 | Belleschi et al. |
| 2014/0206322 A1 | 7/2014 | Dimou .................. H04W 4/005 455/414.1 |
| 2016/0286465 A1 | 9/2016 | Wu ....................... H04W 48/08 |
| 2017/0013657 A1 | 1/2017 | Jung .................... H04W 8/005 |
| 2017/0064620 A1 | 3/2017 | Wang ................... H04W 8/005 |
| 2017/0311347 A1 | 10/2017 | Fujishiro ............. H04W 72/048 |

FOREIGN PATENT DOCUMENTS

| | | |
|---|---|---|
| WO | 2014047907 A1 | 4/2013 |
| WO | 2013109100 A1 | 7/2013 |
| WO | 2013169699 A1 | 11/2013 |
| WO | 2014034286 A1 | 3/2014 |

OTHER PUBLICATIONS

"D2D capability for multi-carrier capable UE," 3GPP TSG-RAN WG2 #86, May 19-23, 2014, R2-142634.
Ericsson, "D2D Broadcast Control Information and Related Procedures," 3GPP TSG RAN WG1 Meeting #77, May 19-23, 2014, R1-142401.
Change Request; Qualcomm Incorporated, "Indication of UE ProSe capability," 3GPP TSG-CT WG1 Meeting #87, C1-142186.
3GPP TS 36.304 V8.5.0, Release 8, 30 pages, Mar. 2009.
3GPP TS 36.101 V8.5.0, Release 8, 121 pages, Mar. 2009.
3GPP TS 36.331 V8.5.0, Release 8, 204 pages, Mar. 2009.

FIG. 16

UE-capability information

D2D band information list 'commSupportedBands' indicating bands supporting D2D communication list 'discSupportedBands' indicating bands supporting D2D discovery

DEVICE-TO-DEVICE (D2D) OPERATION METHOD PERFORMED BY TERMINAL IN WIRELESS COMMUNICATIONS SYSTEM AND TERMINAL USING SAME

CROSS-REFERENCE TO RELATED APPLICATIONS

This application is a continuation of U.S. patent application Ser. No. 15/329,132, filed on Jan. 25, 2017, now allowed, which is the National Stage filing under 35 U.S.C. 371 of International Application No. PCT/KR2015/008315, filed on Aug. 7, 2015, which claims the benefit of U.S. Provisional Application No. 62/034,753 filed on Aug. 7, 2014, the contents of which are all hereby incorporated by reference herein in their entirety.

BACKGROUND OF THE INVENTION

Field of the Invention

The present invention relates to wireless communication, and more particularly, to a method for a D2D operation performed by a terminal in a wireless communication system and a terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a user equipment (UE) may perform a D2D operation only on a current serving frequency according to a capability or may perform the D2D operation on a frequency other than the serving frequency. If a network simply configures only a resource capable of performing the D2D operation, the UE cannot know a frequency to which the resource is applied, and thus it may be difficult to perform the D2D operation.

SUMMARY OF THE INVENTION

The present invention provides a D2D signal transmitting method implemented by a terminal in a wireless communication system and a terminal using the said method.

In one aspect, provided is a device-to-device (D2D) operation method performed by a terminal in a wireless communication system. The method includes receiving a D2D configuration from a cell. The D2D configuration comprises a frequency indicator indicating a frequency on which the terminal performs a D2D operation according to the D2D configuration.

The method may further comprise requesting the cell to provide a D2D configuration for the frequency.

The D2D configuration comprising the frequency indicator may be received through system information.

The D2D configuration comprising the frequency indicator may be received through a dedicated signal for the terminal.

The D2D configuration for the frequency may indicate at least one of a D2D transmission configuration comprising resource information capable of transmitting a D2D signal on the frequency and a D2D reception configuration comprising resource information capable of receiving the D2D signal.

The D2D configuration for the frequency may indicate a resource usable in D2D communication or D2D discovery.

A resource capable of transmitting the D2D signal may be a resource pool.

The D2D transmission configuration may indicate whether a D2D transmission resource is selected by a base station or the D2D transmission resource is selected by the terminal when the D2D transmission resource is selected on the frequency.

A resource capable of receiving the D2D signal may be one or more resource pools.

The cell may be a cell of a first frequency, and the D2D configuration may be a D2D configuration not for the first frequency but for a second frequency.

A D2D operation based on the D2D configuration may be performed with respect to another terminal on a frequency indicated by the frequency indicator.

In another aspect, provided is a terminal comprising a radio frequency (RF) unit for transmitting and receiving a radio signal and a processor operatively coupled to the RF unit. The processor is configured to receive a D2D configuration from a cell, and the D2D configuration comprises a frequency indicator indicating a frequency on which the terminal performs a D2D operation according to the D2D configuration.

According to the present invention, when a network configures a resource capable of performing a device-to-device (D2D) operation, a frequency to which the resource is applied may be reported together. Even if a user equipment (UE) performs the D2D operation on a frequency other than a serving frequency, the resource for the D2D operation can be accurately configured. Reliability of the D2D operation can be improved by removing ambiguity of a D2D configuration.

BRIEF DESCRIPTION OF THE DRAWINGS

FIG. 16 exemplifies UE-capability information including D2D band information according to the method 2-a.

DESCRIPTION OF EXEMPLARY EMBODIMENTS

Figure 1:
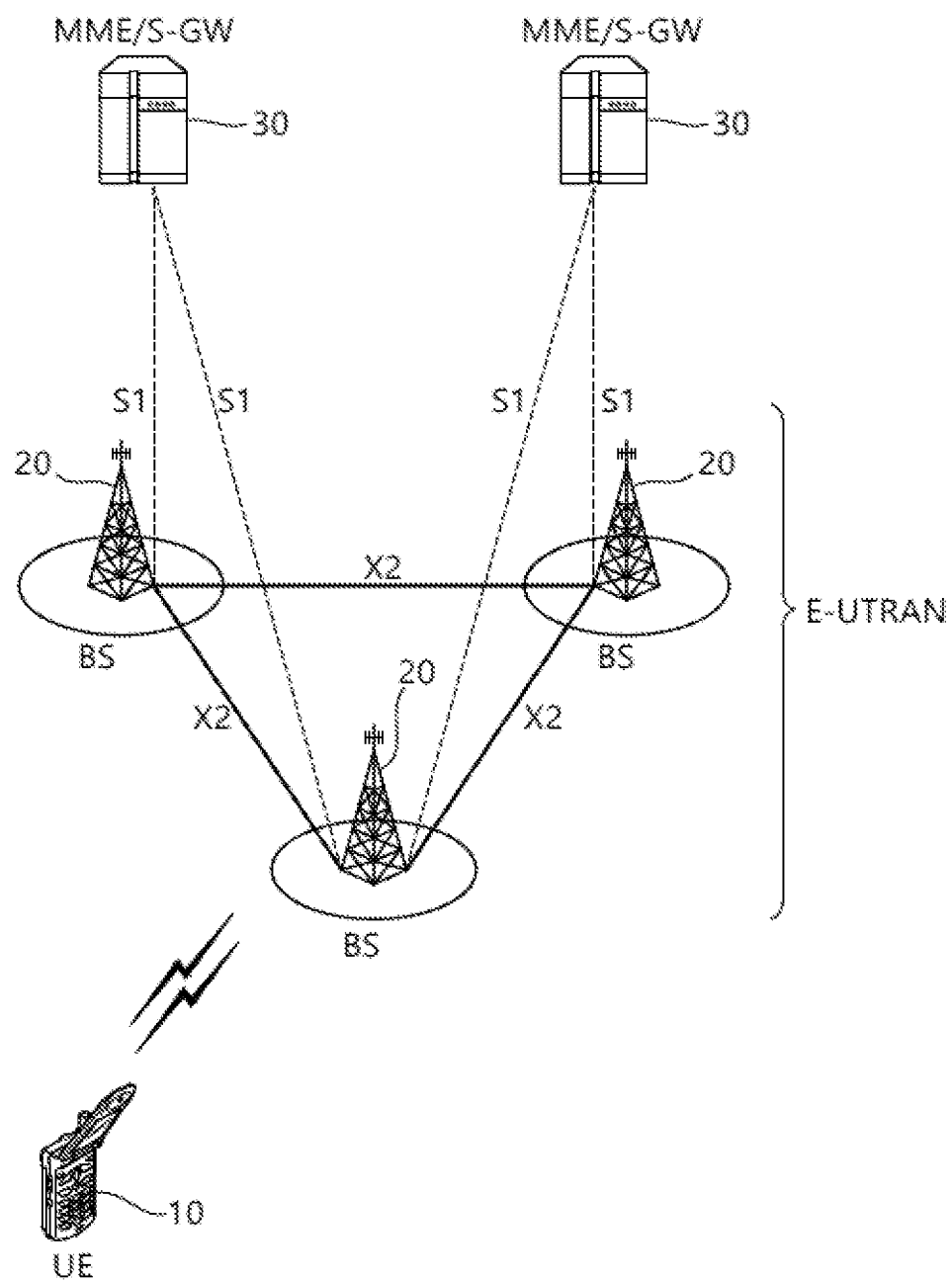
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
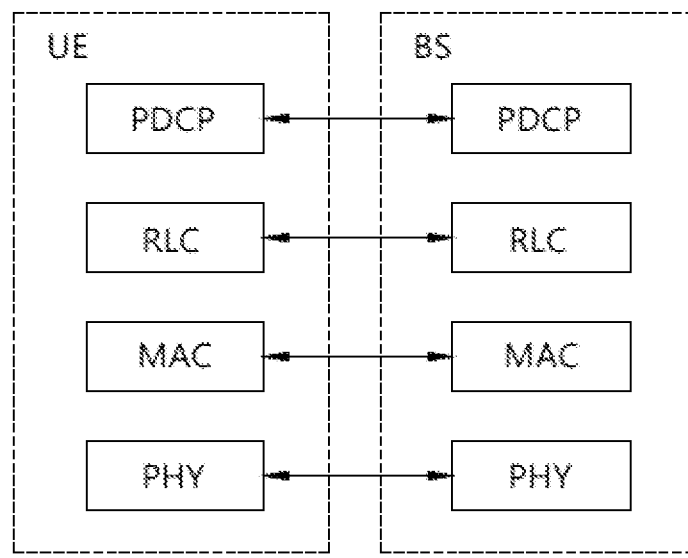
FIG. 2 is a diagram showing a wireless protocol architecture for a user plane.
Figure 3:
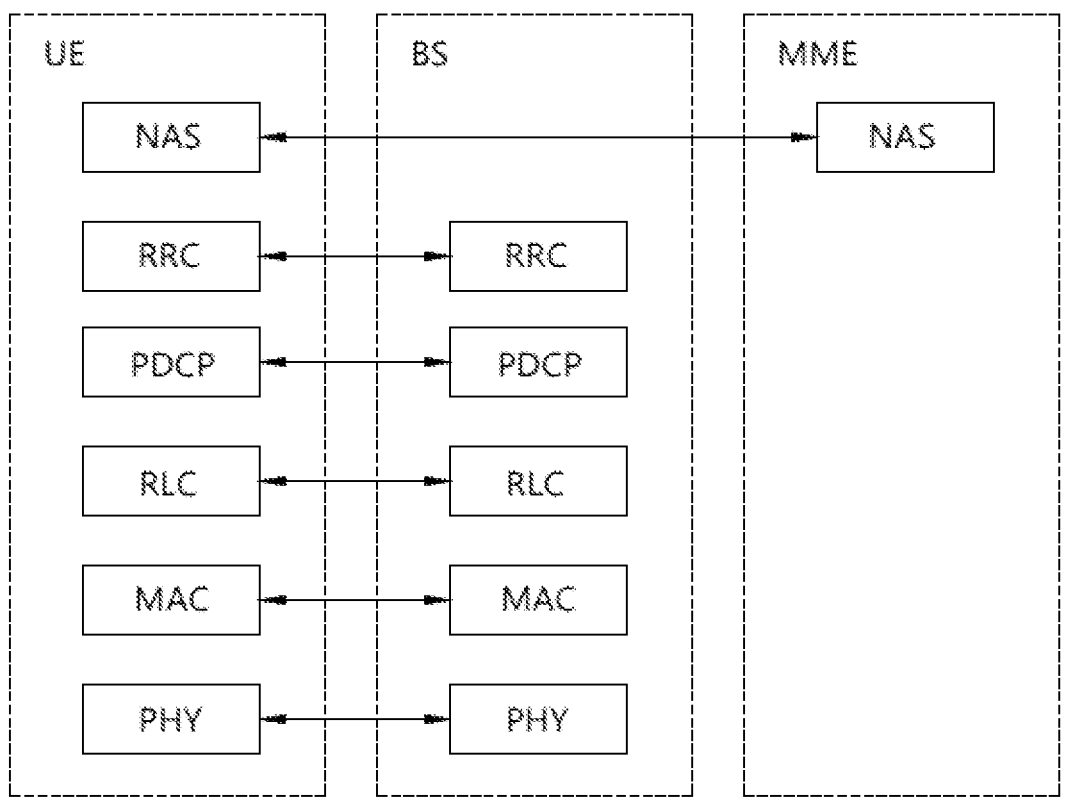
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
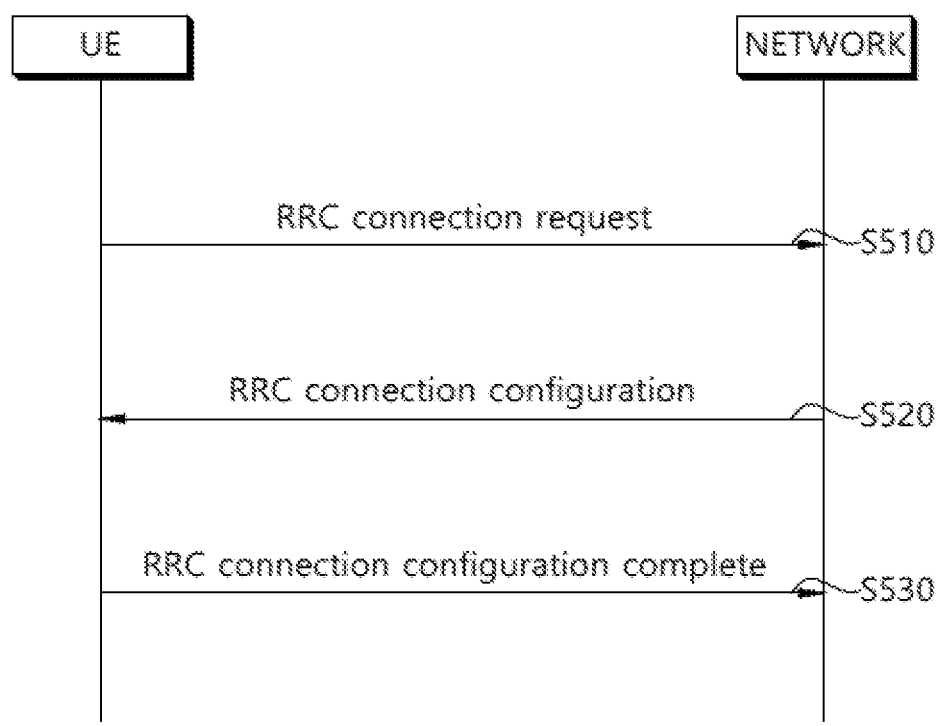
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
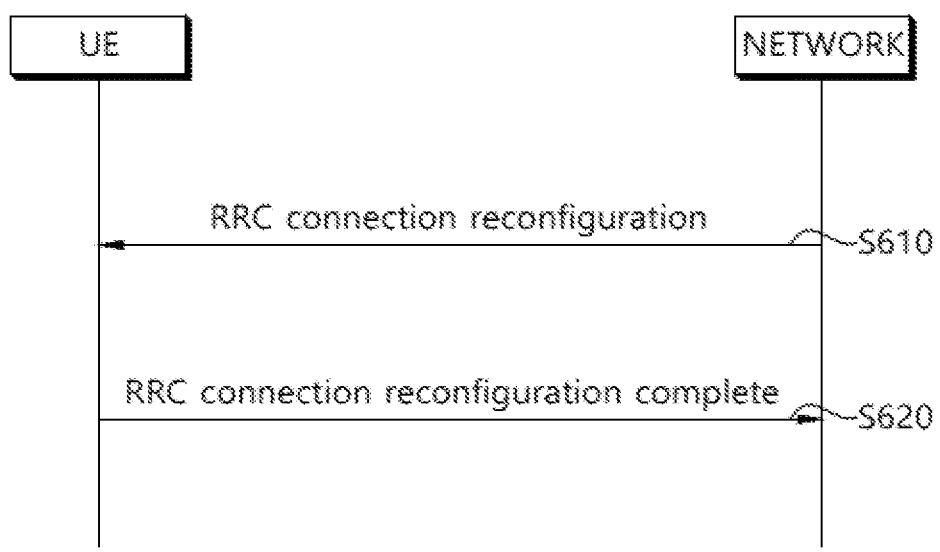
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0 \quad \text{[Equation 1]}$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset})$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Q\text{meas},s + Q\text{hyst}, \quad Rn = Q\text{meas},s - Q\text{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
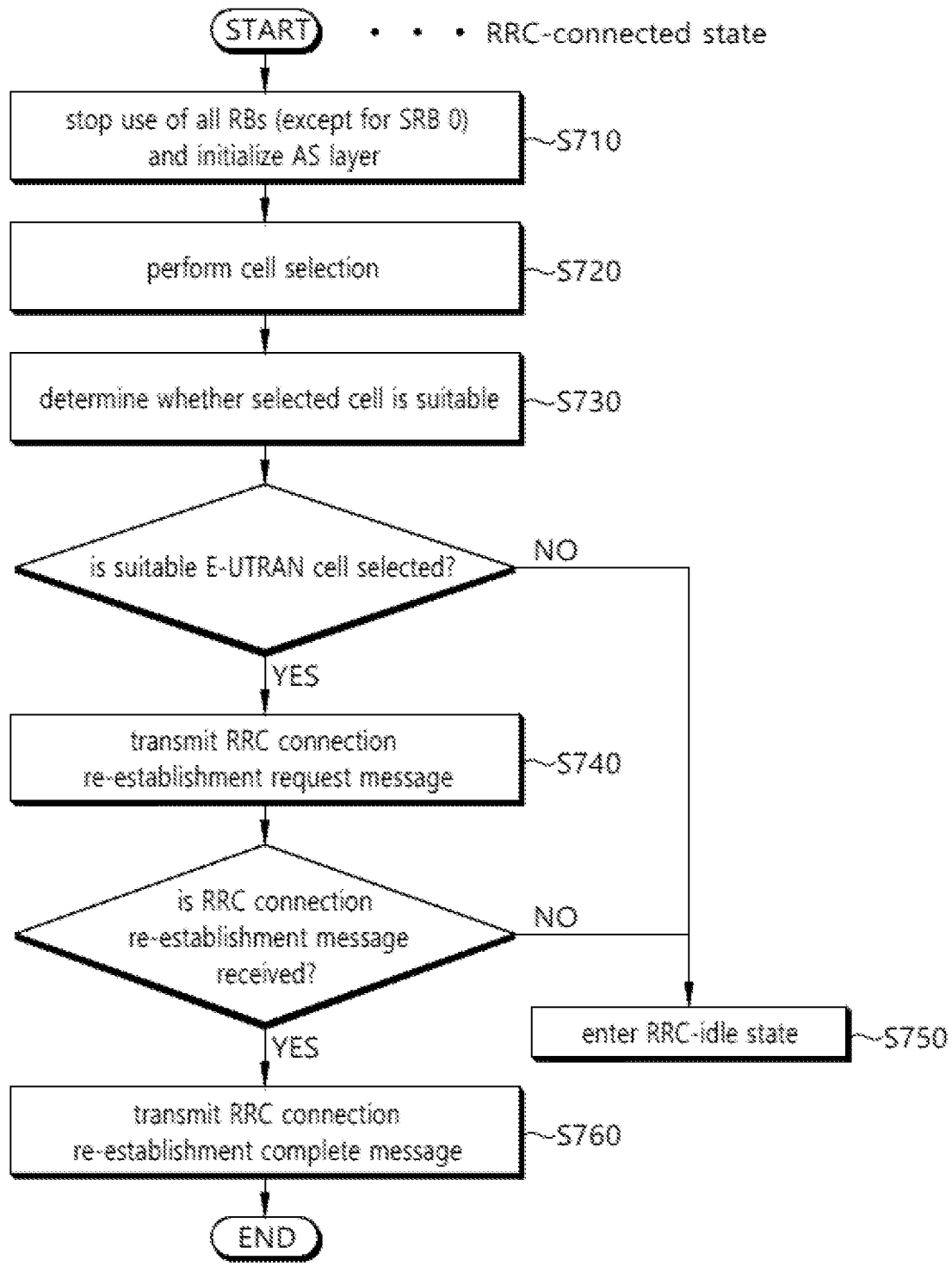
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
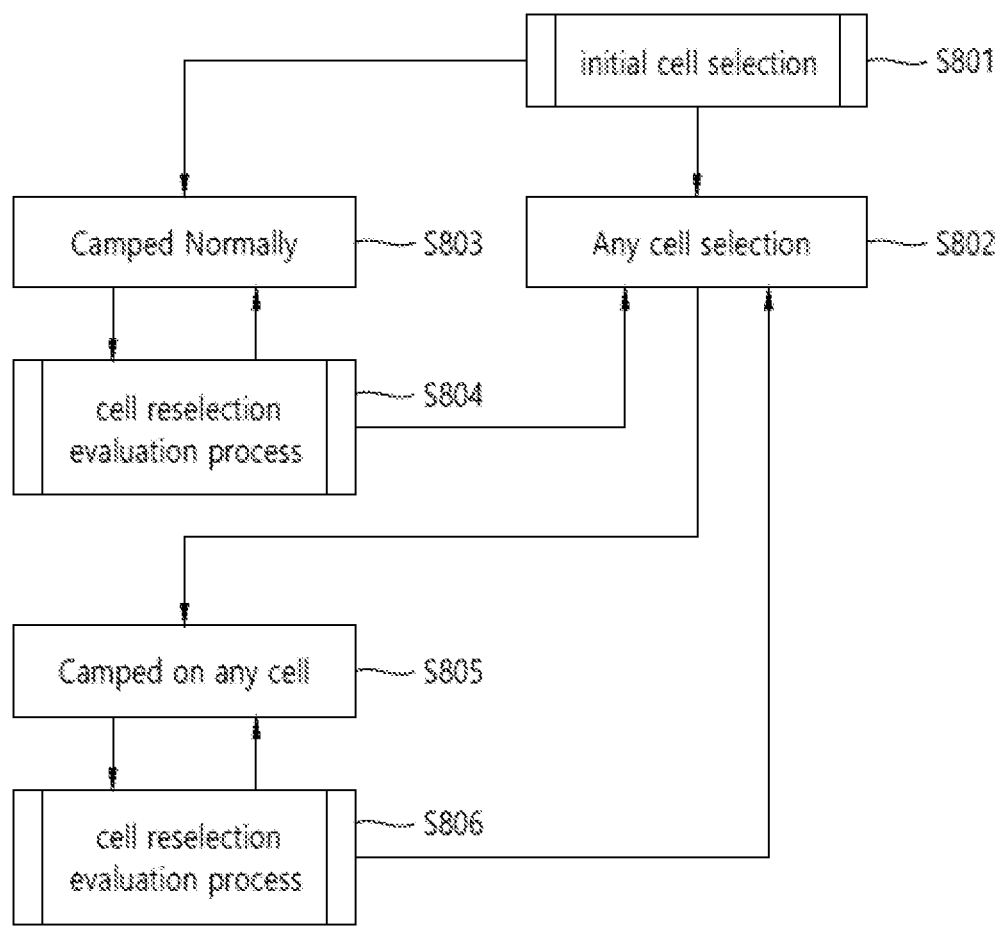
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
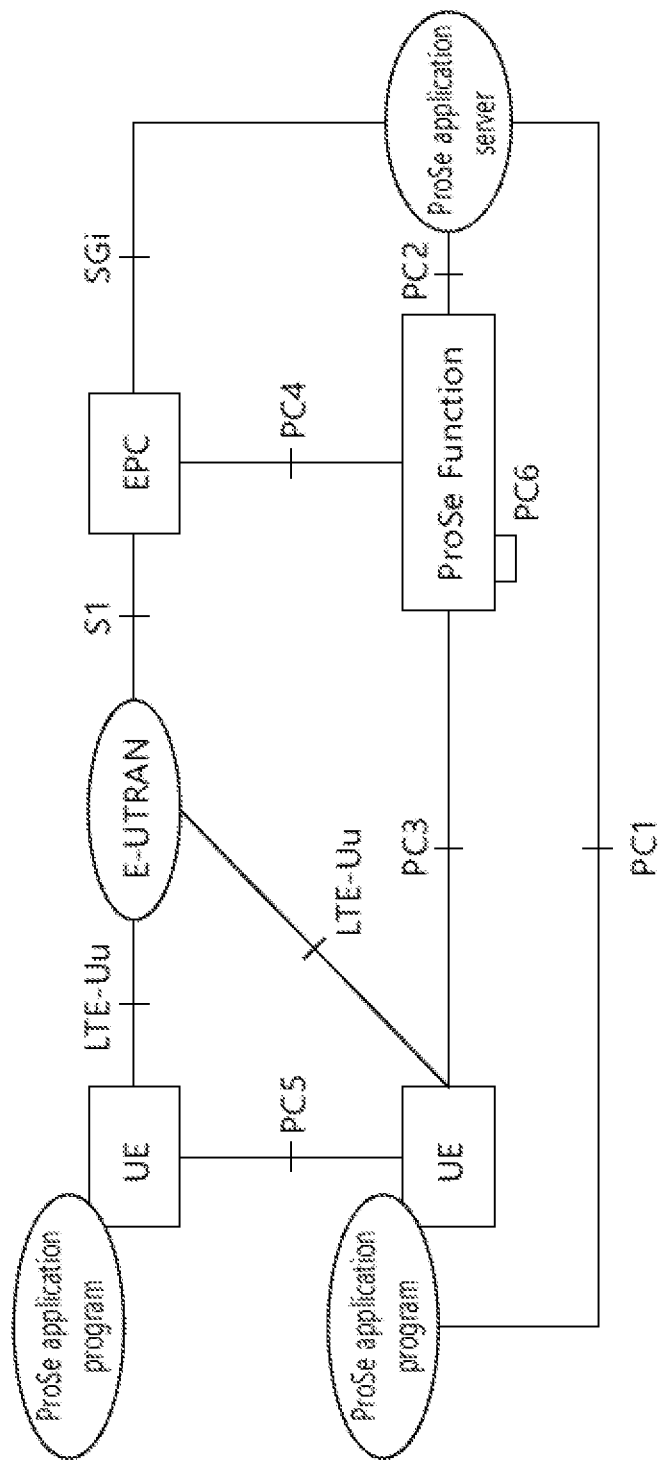
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.
PC1: a reference point between the ProSe application program within the UE and the ProSe application program within the ProSe APP server. This is used to define signaling requirements in an application dimension.
PC2: a reference point between the ProSe APP server and the ProSe function. This is used to define an interaction between the ProSe APP server and the ProSe function. The update of application data in the ProSe database of the ProSe function may be an example of the interaction.
PC3: a reference point between the UE and the ProSe function. This is used to define an interaction between the UE and the ProSe function. A configuration for ProSe discovery and communication may be an example of the interaction.
PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
PC5: a reference point used for using control/user plane for discovery and communication, relay, and 1:1 communication between types of UE.
PC6: a reference point for using a function, such as ProSe discovery, between users belonging to different PLMNs.
SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
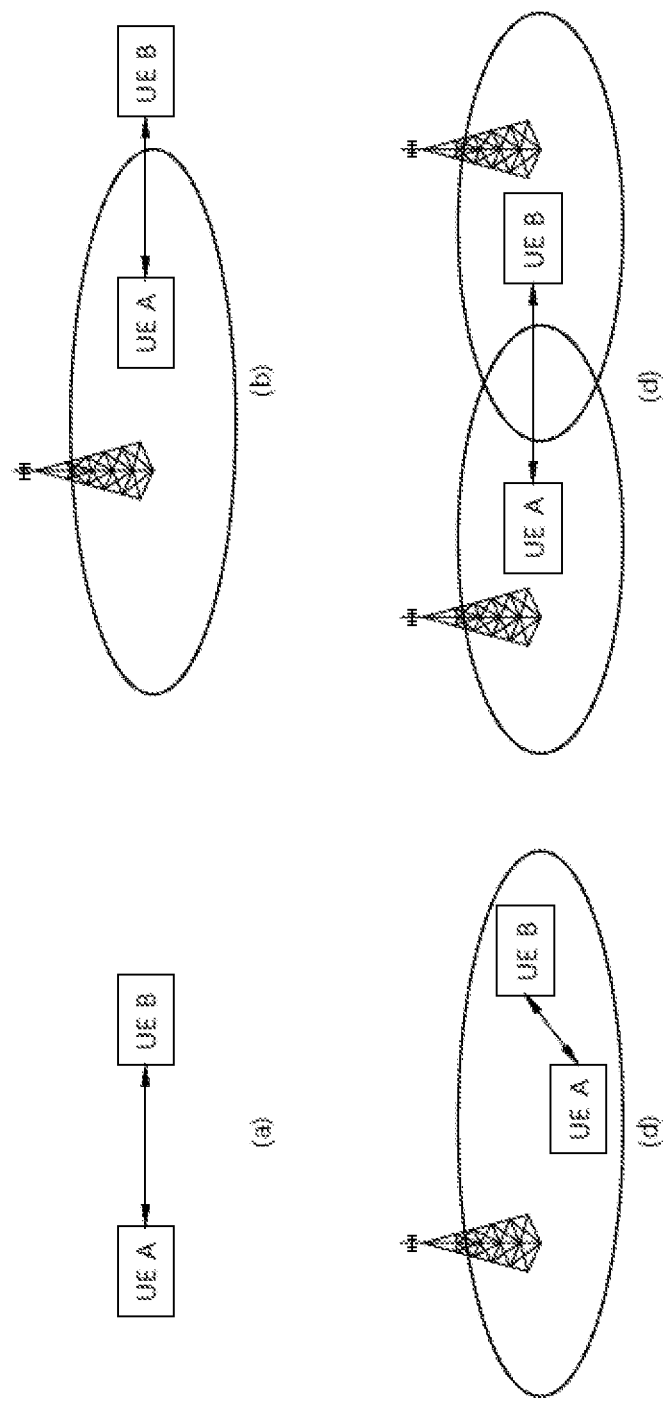
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
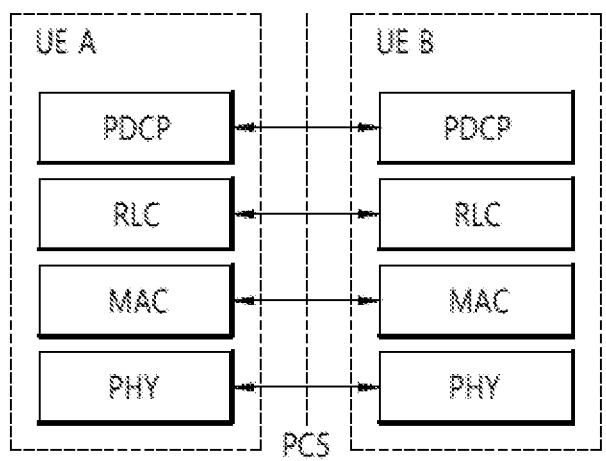
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
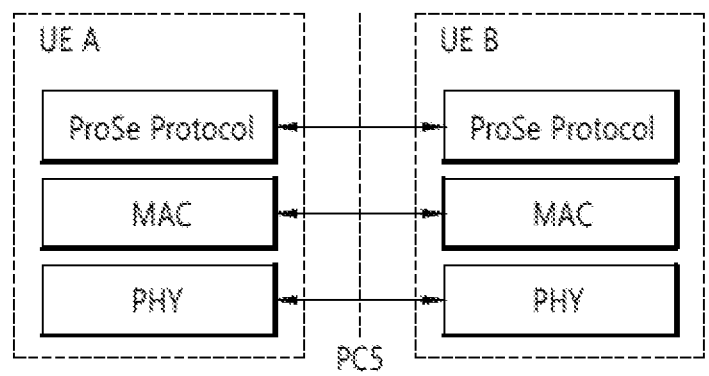
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

The terminal autonomously selects the resource from an indicated resource pool and announces the discovery information by using the selected resource. The terminal may announce the discovery information through an arbitrarily selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
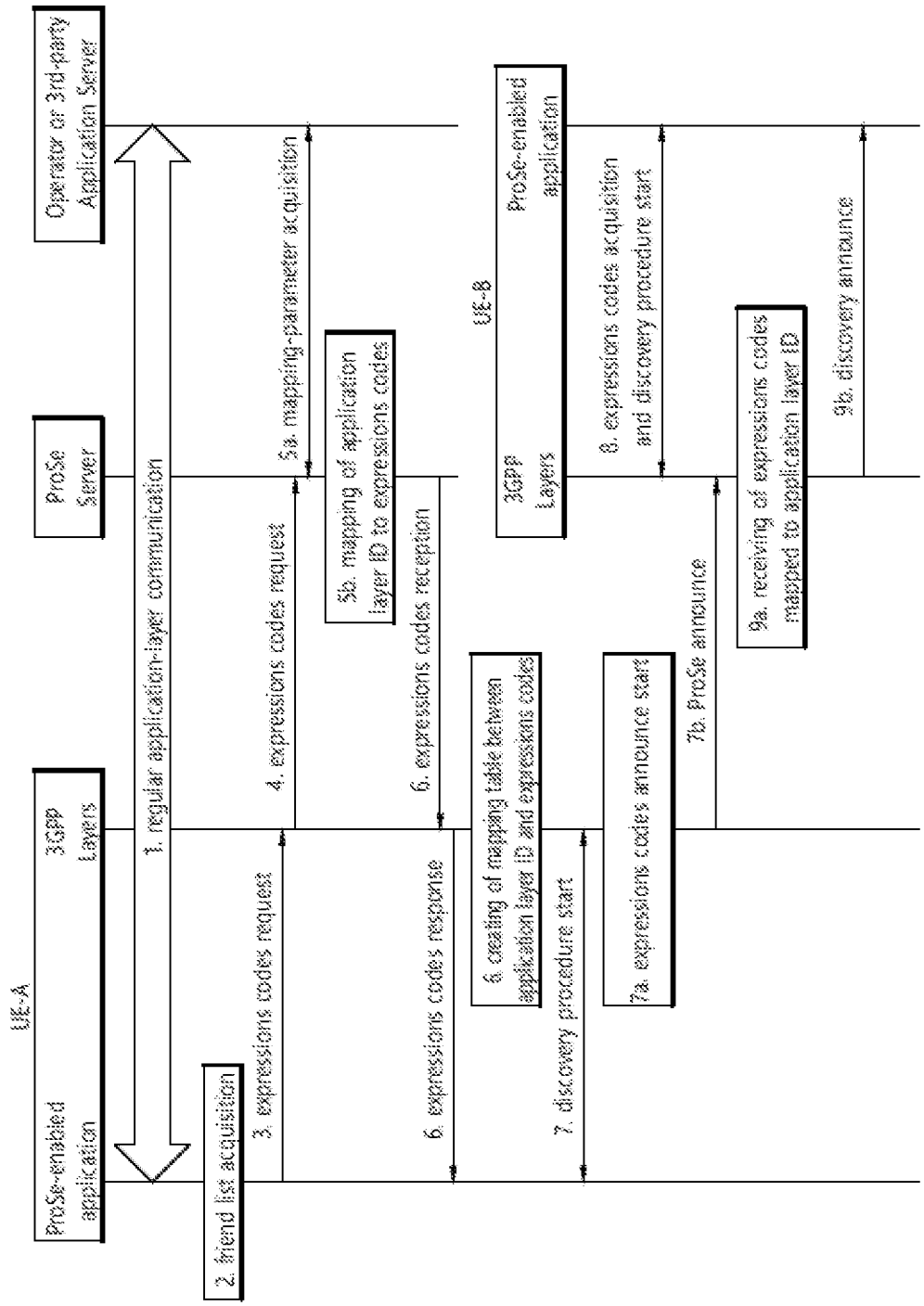
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
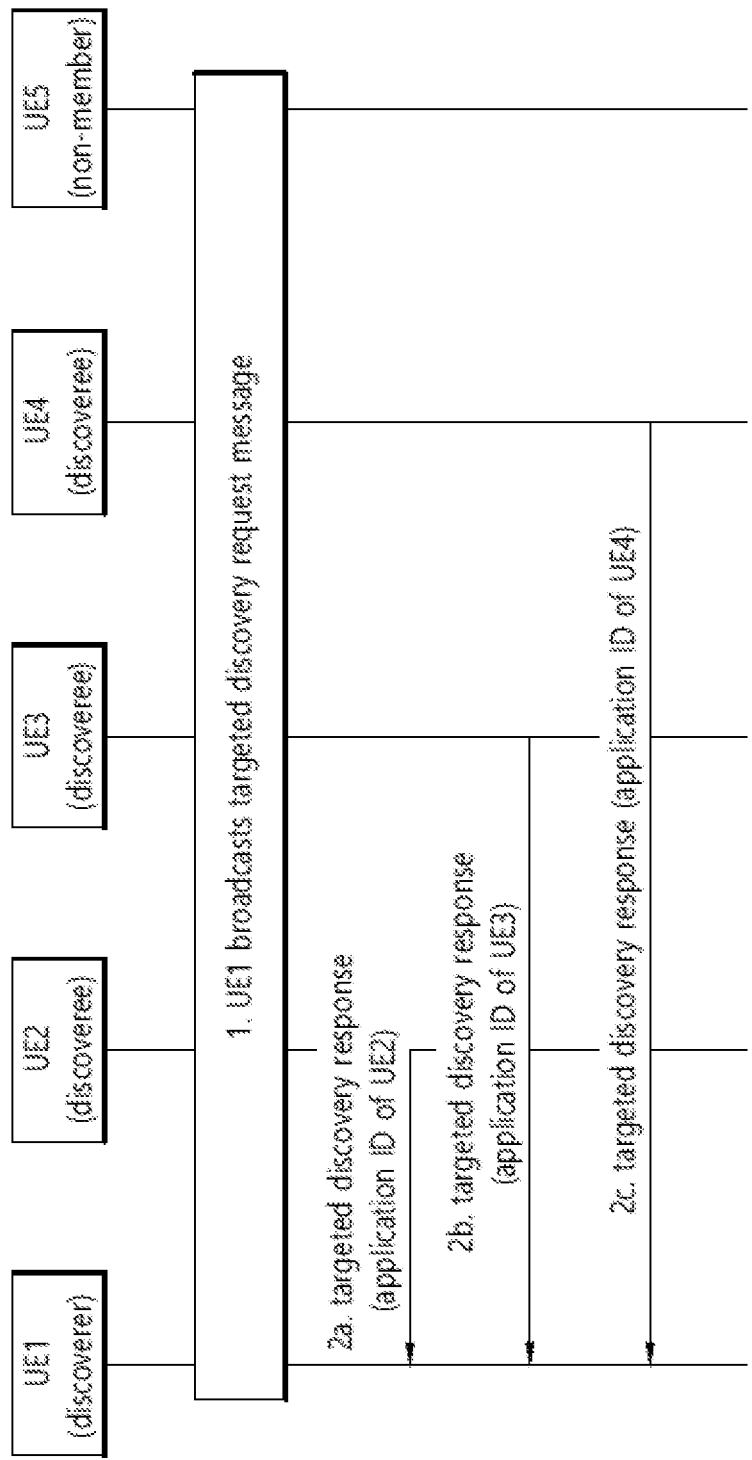
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

It is assumed that an operation described hereinafter is applied to a user equipment (UE) to which the present invention is applied.

<D2D Communication in RRC Idle State>

As to D2D transmission within a cell in an RRC idle state, a network may control whether the D2D transmission is allowed. The network may allow D2D transmission by means of a UE in the RRC state in a specific cell, that is, D2D transmission of a mode 2. In this case, the network may report to the UE whether the D2D transmission of the mode 2 is supported through to-be-broadcast system information of the specific cell. If it fails to receive the system information, the UE may regard that the D2D transmission in the RRC idle state is not allowed in the cell.

Regarding D2D reception in the cell in the RRC idle state, the network does not have to control D2D signal reception of the UE as long as the D2D signal reception is allowed by the network. That is, whether to receive the D2D signal may be determined by the UE. The UE may receive the D2D signal irrespective of whether the D2D transmission in the RRC idle state is supported in the specific cell.

<D2D Communication in RRC Connected State>

If a UE is in an RRC connected state, D2D transmission of the UE is allowed only for a case of having a valid D2D configuration applicable in the RRC connected state. For this, the network may provide a D2D configuration to the UE through an RRC connection reconfiguration message including the D2D configuration.

That is, the UE in the RRC connected state is allowed to perform the D2D transmission only when the network provides the D2D configuration. The D2D configuration may be provided through a signal dedicated for the UE.

Receiving of a D2D signal in the RRC connected state may be determined by the UE as long as the network allows the UE to receive the D2D signal. That is, the receiving of the D2D signal is allowed irrespective of whether the D2D configuration is provided to the UE through the dedicated signal.

<Mode Configuration>

A network may configure at which mode a UE can operate between modes 1 and 2 or at which mode the UE must operate or the like, which is defined as a mode configuration. In this case, signaling for the mode configuration may use a high-layer signal such as RRC or may use a low-layer signal such as a physical layer signal. Since the aforementioned mode configuration is not frequently performed and is not sensitive to a delay, an RRC signal may be used.

Only the mode 2 is applicable to the UE in an RRC idle state. On the other hand, both of the mode 1 and the mode 2 are applicable to the UE in an RRC connected state. That is, selecting/configuring of any one of the modes 1 and 2 is necessary only for the UE in the RRC connected state. Therefore, dedicated RRC signaling may be used for the mode configuration.

Meanwhile, in the mode configuration, a selectable option may be selected from the modes 1 and 2 or may be selected from the modes 1, 2, and 1&2. If the mode 1&2 is configured, the network may schedule a resource for D2D transmission at the request of the UE, and the UE may perform the D2D transmission by using the scheduled resource. Further, the UE may perform the D2D transmission by selecting a specific resource in a resource pool.

The network may configure any one mode to the UE among the mode 1, the mode 2, and the mode 1&2 through dedicated RRC signaling.

<Resource Pool Configuration and Signaling>

From an aspect of D2D signal transmission of a UE, if a UE to which a mode 1 is configured performs D2D transmission, the UE is subjected to scheduling of a resource for the D2D transmission from a network. Accordingly, the UE does not have to know a resource pool for the D2D transmission. If a UE to which a mode 2 is configured performs the D2D transmission, there is a need to know a resource pool for the D2D transmission.

From an aspect of D2D signal reception of a UE, if the UE intends to receive D2D transmission based on a mode 1 of another UE, the UE must know a mode-1 reception resource pool. Herein, the mode-1 reception resource pool may be a set of resource pools used in D2D transmission based on a mode 1 of a serving cell and a neighboring cell. If the UE intends to receive D2D transmission based on a mode 2 of another UE, the UE must know a mode-2 reception resource pool. Herein, the mode-2 reception resource pool may be a set of resource pools used in D2D transmission based on a mode 2 of the serving cell and the neighboring cell.

Regarding the resource pool of the mode 1, the UE does not have to know a mode-1 transmission resource pool. This is because mode-1 D2D transmission is scheduled by the network. However, if a specific UE intends to receive the mode-1 D2D transmission from another UE, the specific UE must know a mode-1 transmission resource pool of other UEs. In order for the specific UE to be able to receive the mode-1 D2D transmission in the RRC idle state, a cell may need to broadcast information for reporting the mode-1 reception resource pool. This information may be applicable to both of the RRC idle state and the RRC connected state.

If the specific cell intends to allow the UE in the cell to perform mode-1 D2D reception, information for reporting the mode-1 reception resource pool may be broadcast. The mode-1 reception resource pool information is applicable to the UE in the cell both in the RRC idle state and the RRC connected state.

In order to allow/enable the UE in the RRC idle state to perform mode-2 D2D transmission, a resource pool that can be used in mode-2 D2D transmission must be reported to the UE in the RRC idle state. For this, a cell may broadcast resource pool information. That is, if a specific cell intends to allow the UE in the RRC idle state to perform D2D transmission, resource pool information indicating a resource pool applicable to D2D transmission in the RRC idle state may be broadcast through system information.

Likewise, in order to allow/enable the UE in the RRC idle state to perform mode-2 D2D reception, a resource pool for the mode-2 D2D reception must be reported to the UE. For this, a cell may broadcast reception resource pool information indicating a reception resource pool.

That is, if a specific cell intends to allow D2D reception by means of the UE in the RRC idle state, the specific cell may broadcast resource pool information indicating a resource pool applicable to D2D reception in the RRC idle state through system information.

The resource pool information indicating a resource pool applicable for D2D transmission in the RRC idle state may also be applicable for mode-2 D2D transmission in the RRC connected state. When the network configures a mode-2 operation to the specific UE through a designated signal, the same resource pool as the resource pool to be broadcast may be provided. Alternatively, it may be regarded that the resource pool to be broadcast is applicable to both of D2D transmission and D2D reception in the RRC connected state. As long as the UE is configured to the mode 2, the resource pool to be broadcast may be regarded as being valid in the RRC connected state. That is, as long as another resource is not indicated by dedicated signaling, mode-2 D2D resource pool information to be broadcast may also be used for mode-2 D2D communication in the RRC connected state.

The resource pool information is not necessarily reported through the designated signal to a specific UE in network coverage. If the resource pool information is reported through the designated signaling, optimization may be possible by reducing a monitoring resource for the specific UE. However, the optimization may require a complex network cooperation between cells.

Now, the present invention is described.

A UE may simultaneously support the conventional cellular communication (that is, it means communication between the UE and a network, and may be referred to as a normal operation) and a D2D operation on the same frequency band according to a capability. Alternatively, the UE may also simultaneously support the conventional normal operation and the D2D operation on different frequency bands according to the capability. That is, the normal operation and the D2D operation may be simultaneously supported on the same frequency band or the different frequency bands according to the capability of the UE.

More specifically, the UE may support the D2D operation only on a serving frequency (a primary or secondary frequency) according to its capability, or may support the D2D operation on a frequency other than the serving frequency.

Further, supporting of D2D signal transmission may be distinguished from supporting of signal transmission based on wide area network (WAN) communication. For example, even if the UE supports the signal transmission based on WAN on F1 and F2, this may not imply that D2D signal transmission is always supported on F1 and F2. That is, a UE supporting WAN-based signal transmission on F1 and F2 supports D2D signal transmission on F1, but may not transmit a D2D signal on F2. On the contrary, there may be a case where a UE supporting D2D signal transmission on F1 and F2 supports WAN-based signal transmission only on F1 (or F2).

This is also equally applied to D2D signal reception and WAN communication-based signal reception. For example, even if the UE supports the WAN-based signal reception on F1 and F2, this may not imply that D2D signal reception is always supported on F1 and F2. That is, a UE supporting WAN-based signal reception on F1 and F2 supports D2D signal reception on F1, but may not support the D2D signal reception on F2. On the contrary, there may be a case where a UE supporting D2D signal reception on F1 and F2 supports WAN-based signal reception only on F1 (or F2).

The UE performs signaling on information reporting its capability to the network, which is called UE-capability information. However, since the UE-capability information based on the conventional standard reports only a frequency band supporting a normal operation, that is, an operation based on cellular communication, there is a problem in that the network cannot know on which frequency band the UE supports the D2D operation, and also on which frequency band (or a combination of frequency bands) the normal operation and the D2D operation are simultaneously supported. Hereinafter, a frequency band may be simply referred to as a frequency or a band. Although EUTRA is exemplified as a network in cellular communication, the present invention is not limited thereto. Unless otherwise specified, the D2D operation collectively includes D2D communication and D2D discovery, and collectively includes transmission and reception in an aspect of transmission/reception.

The present invention proposes that UE-capability information reports a combination of frequencies supporting a carrier aggregation, and simultaneously (or additionally), also reports a frequency supporting a D2D operation (D2D signal transmission and reception).

For example, the UE may report to the network a frequency supporting D2D transmission together with a band combination supporting the carrier aggregation. For example, information indicating {((DL_1, DL_2), UL_1), D2D_TX_2} may be provided to the network as UE-capability information. The information implies that D2D signal transmission is supported on F2 while a carrier aggregation is supported in which F1 and F2 are used in DL and F1 is used in UL.

Similarly, even if the UE supports D2D signal transmission on a plurality of frequencies, this may be reported to the network. For example, information indicating {((DL_1, DL_2), UL_1), (D2D_TX_2, D2D_TX_3)} may be provided to the network as UE-capability information. The information implies that D2D signal transmission is supported on F2 and F3 while a carrier aggregation is supported in which F1 and F2 are used in DL and F1 is used in UL.

Likewise, the UE may report to the network a frequency supporting D2D reception together with a band combination supporting a carrier aggregation. For example, information indicating {((DL_1, DL_2), UL_1), D2D_RX_2} may be provided to the network as UE-capability information. The information implies that D2D signal reception is supported on F2 while a carrier aggregation is supported in which F1 and F2 are used in DL and F1 is used in UL.

Similarly, even if the UE supports D2D signal transmission on a plurality of frequencies, this may be reported to the network. For example, information indicating {((DL_1, DL_2), UL_1), (D2D_RX_2, D2D_RX_3)} may be provided to the network as UE-capability information. The information implies that D2D signal reception is supported on F2 and F3 while a carrier aggregation is supported in which F1 and F2 are used in DL and F1 is used in UL.

Although a frequency capable of transmitting a D2D signal and a frequency capable of receiving a D2D signal are described separately in the above example, the present invention is not limited thereto. Hereinafter, a method of reporting a frequency supporting a D2D operation is described without distinction of the frequencies capable of transmitting/receiving the D2D signal.

Figure 15:
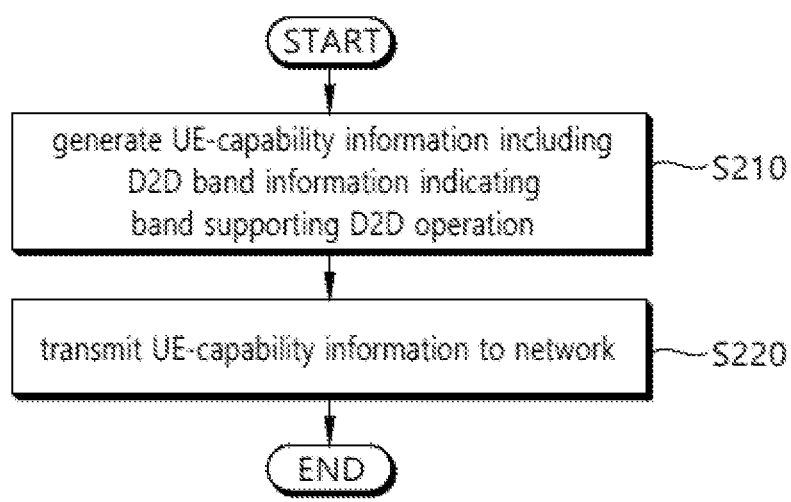
FIG. 15 shows a D2D operation method of a UE according to an embodiment of the present invention.

FIG. 15 shows a D2D operation method of a UE according to an embodiment of the present invention.

Referring to FIG. 15, the UE generates UE-capability information including D2D band information indicating a frequency band supporting a D2D operation (S210), and transmits the UE-capability information to a network (S220).

That is, in order for the UE to report on which frequency band or band combination (BC) a normal operation and a D2D operation are allowed, the UE may report D2D band information indicating bands (a band combination) supporting the D2D operation to the network. The D2D band information may be transmitted to the network by being included in the UE-capability information.

Bands indicated by the D2D band information may be bands on which the UE can simultaneously support the normal operation and the D2D operation. For example, while transmitting the D2D band information including a list indicating bands on which the UE supports the D2D operation, apart from this, a list indicating bands supporting the normal operation may also be transmitted. In this case, a band indicated together by a list indicating bands supporting the normal operation and a list indicating bands supporting the D2D operation is a band on which the normal operation and the D2D operation are both supported. Alternatively, the D2D band information may include a list directly indicating bands on which the UE can simultaneously support the normal operation and the D2D operation.

Meanwhile, if the UE supports a carrier aggregation, the UE may provide a list of bands subjected to the carrier aggregation and supporting the normal operation and bands supporting the D2D operation (The list may be provided respectively for the bands subjected to the carrier aggregation and supporting the normal operation and bands supporting the D2D operation, or may be provided as one list). Each frequency band of the list or each combination of the frequency bands indicates a frequency band capable of simultaneously performing the normal operation and the D2D operation. Hereinafter, for convenience of explanation, if it is simply expressed that the UE supports a band X, it means that the conventional cellular communication (a normal operation) is supported, and it is not additionally specified when the D2D operation is supported for the band X.

It is assumed that the UE can support the band A, the band B, and the band C, and also can support a carrier aggregation (CA) which uses two bands in downlink and one band in uplink. If it is a case where a current carrier aggregation is not configured to the UE, a band supported by the UE may be expressed as a list including {A}, {B}, and {C}.

If the current carrier aggregation is configured to the UE, the UE needs to report to the network a combination supported by the UE among various combinations of the bands A, B, and C. In case of the carrier aggregation which uses two bands in downlink and one band in uplink, various combinations may exist as shown in the following table.

TABLE 2

| band combination | meaning |
| --- | --- |
| {{A, B}, A} | support downlink through bands A and B, and support uplink through band A |
| {{A, B}, B} | support downlink through bands A and B, and support uplink through band B |
| {{A, B}, C} | support downlink through bands A and B, and support uplink through band C |
| {{A, C}, A} | support downlink through bands A and C, and support uplink through band A |
| {{A, C}, C} | support downlink through bands A and C, and support uplink through band C |
| {{A, C}, B} | support downlink through bands A and C, and support uplink through band B |
| {{B, C}, B} | support downlink through bands B and C, and support uplink through band B |
| {{B, C}, C} | support downlink through bands B and C, and support uplink through band C |
| {{B, C}, A} | support downlink through bands B and C, and support uplink through band A |

If the UE supports all band combinations as shown in Table 2 above, the UE may need to report to the network all band combinations of Table 2 above, and may transmit to the network a list including all band combinations of Table 2.

Meanwhile, if the UE also supports the D2D operation, in addition to a band combination supporting bands/carrier aggregation supported by the UE, a band supporting the D2D operation may also need to be reported to the network.

First, if the UE does not support the carrier aggregation or does not have the carrier aggregation configured thereto, and supports only the D2D operation, a band supported by the UE and a D2D operation support band may be indicated by using a method shown in the following table. Since the carrier aggregation is not supported or is not configured, the D2D operation is supported through one carrier (cell) other than a plurality of carriers (cells).

TABLE 3

| band combination | meaning |
| --- | --- |
| {A, A(D2D)} | support band A, and support band A in D2D operation |
| {A, B(D2D)} | support band A, and support band B in D2D operation |
| {A, C(D2D)} | support band A, and support band C in D2D operation |
| {B, A(D2D)} | support band B, and support band A in D2D operation |
| {B, B(D2D)} | support band B, and support band B in D2D operation |
| {B, C(D2D)} | support band B, and support band C in D2D operation |
| {C, A(D2D)} | support band C, and support band A in D2D operation |
| {C, B(D2D)} | support band C, and support band B in D2D operation |
| {C, C(D2D)} | support band C, and support band C in D2D operation |

If the UE supports the D2D operation through the plurality of bands (that is, the UE can simultaneously support the D2D operation through the plurality of bands during cellular communication is performed through one band), the band supported by the UE and the D2D operation support band may be indicated as shown in the following table.

TABLE 4

| band combination | meaning |
| --- | --- |
| {A, {A(D2D), B(D2D)}} | support band A, and support bands A and B in D2D operation |
| {A, {A(D2D), C(D2D)}} | support band A, and support bands A and C in D2D operation |
| {A, {B(D2D), C(D2D)}} | support band A, and support bands B and C in D2D operation |
| {A, {A(D2D), B(D2D), C(D2D)}} | support band A, and support bands A, B and C in D2D operation |
| {B, {A(D2D), B(D2D)}} | support band B, and support bands A and B in D2D operation |
| {B, {A(D2D), C(D2D)}} | support band B, and support bands A and C in D2D operation |
| {B, {B(D2D), C(D2D)}} | support band B, and support bands B and C in D2D operation |
| {B, {A(D2D), B(D2D), C(D2D)}} | support band B, and support bands A, B and C in D2D operation |
| {C, {A(D2D), B(D2D)}} | support band C, and support bands A and B in D2D operation |
| {C, {A(D2D), C(D2D)}} | support band C, and support bands A and C in D2D operation |
| {C, {B(D2D), C(D2D)}} | support band C, and support bands B and C in D2D operation |
| {C, {A(D2D), B(D2D), C(D2D)}} | support band C, and support bands A, B and C in D2D operation |

If the UE supports the carrier aggregation, the UE may also report band combinations supporting the D2D operation together with band combinations supporting the carrier aggregation.

For example, if the carrier aggregation which uses two bands in downlink and one band in uplink is configured to the UE supporting the carrier aggregation and if the UE supports the D2D operation through one band, the UE may indicate band combinations as shown in the following table.

TABLE 5

| band combination | meaning |
| --- | --- |
| {{A, B}, A, A(D2D)} | support downlink through bands A and B, and support D2D operation on band A together with carrier aggregation supporting downlink through band A |
| {{A, B}, A, B(D2D)} | support downlink through bands A and B, and support D2D operation on band B together with carrier aggregation supporting downlink through band A |
| {{A, B}, A, C(D2D)} | support downlink through bands A and B, and support D2D operation on band C together with carrier aggregation supporting downlink through band A |
| {{A, B}, B, A(D2D)} | support downlink through bands A and B, and support D2D operation on band A together with carrier aggregation supporting downlink through band B |
| {{A, B}, B, B(D2D)} | support downlink through bands A and B, and support D2D operation on band B together with carrier aggregation supporting downlink through band B |
| {{A, B}, B, C(D2D)} | support downlink through bands A and B, and support D2D operation on band C together with carrier aggregation supporting downlink through band B |

TABLE 5-continued

| band combination | meaning |
|---|---|
| {{A, C}, A, A(D2D)} | support downlink through bands A and C, and support D2D operation on band A together with carrier aggregation supporting downlink through band A |
| {{A, C}, A, B(D2D)} | support downlink through bands A and C, and support D2D operation on band B together with carrier aggregation supporting downlink through band A |
| {{A, C}, A, C(D2D)} | support downlink through bands A and C, and support D2D operation on band C together with carrier aggregation supporting downlink through band A |
| {{A, C}, C, A(D2D)} | support downlink through bands A and C, and support D2D operation on band A together with carrier aggregation supporting downlink through band C |
| {{A, C}, C, B(D2D)} | support downlink through bands A and C, and support D2D operation on band B together with carrier aggregation supporting downlink through band C |
| {{A, C}, C, C(D2D)} | support downlink through bands A and C, and support D2D operation on band C together with carrier aggregation supporting downlink through band C |
| {{B, C}, A, A(D2D)} | support downlink through bands B and C, and support D2D operation on band A together with carrier aggregation supporting downlink through band A |
| {{B, C}, A, B(D2D)} | support downlink through bands B and C, and support D2D operation on band B together with carrier aggregation supporting downlink through band A |
| {{B, C}, A, C(D2D)} | support downlink through bands B and C, and support D2D operation on band C together with carrier aggregation supporting downlink through band A |
| {{B, C}, C, A(D2D)} | support downlink through bands B and C, and support D2D operation on band A together with carrier aggregation supporting downlink through band C |
| {{B, C}, C, B(D2D)} | support downlink through bands B and C, and support D2D operation on band B together with carrier aggregation supporting downlink through band C |
| {{B, C}, C, C(D2D)} | support downlink through bands B and C, and support D2D operation on band C together with carrier aggregation supporting downlink through band C |

Meanwhile, if the carrier aggregation which uses two bands in one downlink and one band in uplink is configured to the UE supporting the carrier aggregation and if the UE supports the D2D operation through a plurality of bands, the UE may indicate band combinations as shown in the following table.

TABLE 6

| band combination | meaning |
|---|---|
| {{A, B}, A, {A(D2D), B(D2D)}} | support downlink through bands A and B, and support D2D operation on bands A and B together with carrier aggregation supporting downlink through band A |
| {{A, B}, A, {A(D2D), C(D2D)}} | support downlink through bands A and B, and support D2D operation on bands A and C together with carrier aggregation supporting downlink through band A |
| {{A, B}, A, {B(D2D), C(D2D)}} | support downlink through bands A and B, and support D2D operation on bands B and C together with carrier aggregation supporting downlink through band A |
| {{A, B}, A, {A(D2D), B(D2D), C(D2D)}} | support downlink through bands A and B, and support D2D operation on bands A, B and C together with carrier aggregation supporting downlink through band A |
| {{A, B}, B, {A(D2D), B(D2D)}} | support downlink through bands A and B, and support D2D operation on bands A and B together with carrier aggregation supporting downlink through band B |
| {{A, B}, B, {A(D2D), C(D2D)}} | support downlink through bands A and B, and support D2D operation on bands A and C together with carrier aggregation supporting downlink through band B |
| {{A, B}, B, {B(D2D), C(D2D)}} | support downlink through bands A and B, and support D2D operation on bands B and C together with carrier aggregation supporting downlink through band B |
| {{A, B}, B, {A(D2D), B(D2D), C(D2D)}} | support downlink through bands A and B, and support D2D operation on bands A, B and C together with carrier aggregation supporting downlink through band B |
| {{A, C}, A, {A(D2D), B(D2D)}} | support downlink through bands A and C, and support D2D operation on bands A and B together with carrier aggregation supporting downlink through band A |
| {{A, C}, A, {A(D2D), C(D2D)}} | support downlink through bands A and C, and support D2D operation on bands A and C together with carrier aggregation supporting downlink through band A |
| {{A, C}, A, {B(D2D), C(D2D)} | support downlink through bands A and C, and support D2D operation on bands B and C together with carrier aggregation supporting downlink through band A |
| {{A, C}, A, {A(D2D), B(D2D), C(D2D)}} | support downlink through bands A and C, and support D2D operation on bands A, B and C together with carrier aggregation supporting downlink through band A |
| {{A, C}, C, {A(D2D), B(D2D)}} | support downlink through bands A and C, and support D2D operation on bands A and B together with carrier aggregation supporting downlink through band C |
| {{A, C}, C, {A(D2D), C(D2D)}} | support downlink through bands A and C, and support D2D operation on bands A and C together with carrier aggregation supporting downlink through band C |
| {{A, C}, C, {B(D2D), C(D2D)}} | support downlink through bands A and C, and support D2D operation on bands B and C together with carrier aggregation supporting downlink through band C |
| {{A, C}, C, {A(D2D), B(D2D), C(D2D)}} | support downlink through bands A and C, and support D2D operation on bands A, B and C together with carrier aggregation supporting downlink through band C |
| {{B, C}, A, {A(D2D), B(D2D)}} | support downlink through bands B and C, and support D2D operation on bands A and B together with carrier aggregation supporting downlink through band A |
| {{B, C}, A, {A(D2D), C(D2D)}} | support downlink through bands B and C, and support D2D operation on bands A and C together with carrier aggregation supporting downlink through band A |
| {{B, C}, A, {B(D2D), C(D2D)}} | support downlink through bands B and C, and support D2D operation on bands B and C together with carrier aggregation supporting downlink through band A |
| {{B, C}, A, {A(D2D), B(D2D), C(D2D)}} | support downlink through bands B and C, and support D2D operation on bands A, B and C together with carrier aggregation supporting downlink through band A |
| {{B, C}, C, {A(D2D), B(D2D)}} | support downlink through bands B and C, and support D2D operation on bands A and B together with carrier aggregation supporting downlink through band C |
| {{B, C}, C, {A(D2D), C(D2D)}} | support downlink through bands B and C, and support D2D operation on bands A and C together with carrier aggregation supporting downlink through band C |

TABLE 6-continued

| band combination | meaning |
| --- | --- |
| {{B, C}, C, {B(D2D), C(D2D)}} | support downlink through bands B and C, and support D2D operation on bands B and C together with carrier aggregation supporting downlink through band C |
| {{B, C}, C {A(D2D), B(D2D), C(D2D)}} | support downlink through bands B and C, and support D2D operation on bands A, B and C together with carrier aggregation supporting downlink through band C |

As described in Tables 3 to 6, the UE also reports bands supporting the D2D operation to the network together with bands supporting cellular communication.

According to the present invention, a method of reporting bands supporting a D2D operation may use any one of the following three methods.

<Method 1-a>

When a UE reports to a network a list of bands supporting cellular communication, that is, a normal operation, whether the D2D operation is supported (Yes/No) may be indicated for each band. This method has an advantage in that a signaling level required to indicate band information supporting the D2D operation can be decreased, but has a disadvantage in that a band not supporting cellular communication but supporting only D2D cannot be indicated.

<Method 1-b>

When a UE reports to a network a list of bands supporting cellular communication, that is, a normal operation, in addition to the list, a list supporting the D2D operation is reported to the network. This method has an advantage in that a band not supporting cellular communication but supporting only the D2D operation can be indicated, but has a disadvantage in that a signaling level is relatively greater than that of the method 1-a.

<Method 1-c>

As a method of taking only the advantages of the method 1-a and the method 1-b, when a UE reports to a network a list of bands supporting cellular communication by using the method 1-a, whether to support the D2D operation (Yes/No) is indicated for each band of the list. If there is a band not supporting the cellular communication but supporting only the D2D operation, the band is reported as a separate list by additionally using the method 1-b.

Meanwhile, the D2D operation includes D2D communication and D2D discovery. A method in which a UE reports a band supporting each D2D operation to a network includes the following two methods.

<Method 2-a> A UE may separately report a band supporting D2D communication and a band supporting D2D discovery.

FIG. 16 exemplifies UE-capability information including D2D band information according to the method 2-a.

Referring to FIG. 16, the UE-capability information includes the D2D band information. The D2D band information separately includes a list indicating bands supporting D2D communication (this is called 'commSupportedBands') and a list indicating bands supporting D2D discovery (this is called 'discSupportedBands').

For example, it is assumed that the UE supports D2D communication on a band J and a D2D discovery operation on a band K. In this case, the UE includes the band J in 'commSupportedBands', and includes the band K in 'discSupportedBands'.

<Method 2-b>

The method 2-b is different from the method 2-a in that a UE may report a band on which a D2D operation is possible, that is, a band on which D2D communication and D2D discovery are both possible without distinction. For example, it is assumed that a UE supporting a carrier aggregation which uses two bands (bands X and Y) in downlink and one band (band X) in uplink simultaneously supports D2D communication and D2D discovery operations on a band J. In this case, the UE includes the band J in D2D band information, and a network which receives this may interpret that both of D2D communication and D2D discovery are supported on the band J. UE-capability information delivers information of {{band X in downlink, band Y in downlink}, band X in uplink, band J for D2D operation} to the network.

According to the aforementioned method, the UE may deliver D2D band information to the network. Meanwhile, considering a possibility that cellular communication (a normal operation) and a D2D operation may occur simultaneously at the same time, the UE may need to provide the network with information regarding whether to support a simultaneous execution of the normal operation and the D2D operation. If the UE does not support the simultaneous execution of the normal operation and the D2D operation, an eNB may need to adjust scheduling of the normal operation or restrict the D2D operation so that the operations are simultaneously performed. If the UE can perform the D2D operation on a band B simultaneously while performing the normal operation on a band A but cannot perform the D2D operation on the band B simultaneously while performing the normal operation on a band C, the eNB may perform a mobility procedure (e.g., handover) so that the UE performs the normal operation on the band A. The following method may be used to report to the network the information regarding whether the UE supports the simultaneous execution of the normal operation and the D2D operation.

<Method 3-a>

When a UE reports to a network a list of bands or band combinations supporting a normal operation, whether to support a simultaneous execution of a D2D operation (Yes/No) is indicated for each band of the list.

The UE may report a capability of the D2D operation of the UE to the network by using only one of the method 3-a and method 1 series (methods 1-a, 1-b, 1-c), or by separately using the method 3-a and the method 1 series. As an example of using only one of the method 3-a and the method 1 series, the UE can use only one of the two methods, i.e., the method 3-a and the method 1-a. In this case, when it is indicated that the UE supports the D2D operation on a specific band, it implies that the simultaneous execution of the normal operation and the D2D operation is possible on the band. As an example of using the method 3-a and the method 1 series, the UE can separately use the method 3-a and the method 1-a. In this case, for a band on which the UE supports the D2D operation through the method 1-a, additionally, whether the simultaneous execution of the normal operation and the D2D operation is possible may be separately indicated on the band through the method 3-a.

<Method 3-b>

When a UE reports to a network a list of bands/band combinations supporting cellular communication (a normal operation), D2D band information for enabling a simultaneous execution of a D2D operation for each entry in the list, that is, each of the bands/band combinations, is reported to the network.

The D2D band information for enabling the simultaneous execution may be expressed through a band list. Alternatively, the D2D band information for enabling the simultaneous execution may be expressed through a bitmap indicating whether the UE supports the simultaneous execution for each band included in a list of bands on which the UE supports the D2D operation through the method 1 series. The number of bits of the bitmap may be equal to the number of bands indicated as that the UE supports the D2D operation through the method 1 series.

As an example based on the method 3-b, a band on which the UE supports the D2D operation may be reported to the network as a D2D support band list of {A, B, C}, and the UE may additionally indicate a bitmap having a length of 3 while indicating a combination {A, B} of a band A and a band B as a combination for which a carrier aggregation is possible. Bits of the bitmap indicate whether to support respective bands of the D2D support band list. If the UE indicates 100 through a bitmap for a band combination {A, B} for which the UE indicates that the carrier aggregation is possible, this information implies that the UE supports a simultaneous execution of a carrier aggregation operation which uses the band combination {A, B} and a D2D operation on the band A. Similarly, if the UE indicates 110 through a bitmap for the band combination {A, B} for which the UE indicates that the carrier aggregation is possible, the information implies that the UE supports a simultaneous execution of a carrier aggregation operation which uses the band combination {A, B} and a D2D operation on the band A, and also the UE supports a simultaneous execution of the carrier aggregation operation which uses the band combination {A, B} and the D2D operation on the band B.

Figure 17:
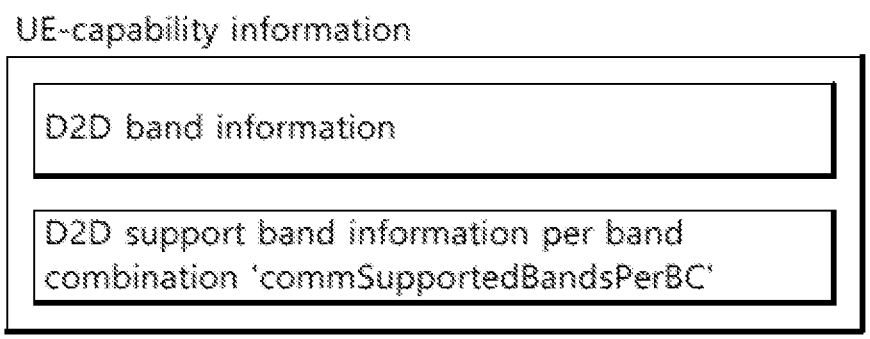
FIG. 17 shows another example of UE-capability information according to the present invention.

FIG. 17 shows another example of UE-capability information according to the present invention.

Referring to FIG. 17, the UE-capability information may further include D2D support band information per band combination ('commSupportedBandsPerBC') other than the D2D band information described with reference to FIG. 15 and FIG. 16.

The D2D support band information per band combination may indicate a frequency band on which the UE simultaneously supports cellular communication (a normal operation) performed by the UE with the network and a D2D operation performed with another UE on a band combination (BC) consisting of two or more frequency bands.

For example, in Table 5 above, the UE may deliver information such as {{A, B}, A, A(D2D)} to the network. This means that it is reported to the network that the D2D operation is supported on the band A together with a carrier aggregation supporting downlink through the bands A and B and supporting uplink through the band A. In this case, the UE indicates the band A as a frequency band simultaneously supporting the cellular communication and the D2D operation for the band combination consisting of the bands A and B. In this case, the UE may report that the band A simultaneously supports the cellular communication and the D2D operation for the band combination consisting of the bands A and B through the D2D support band information per band combination.

More specifically, the D2D support band information per band combination may indicate bands on which the UE supports simultaneous reception of a signal based on cellular communication (e.g., a signal based on EUTRA) and a signal based on D2D communication for a specific band combination (BC).

If simultaneous transmission of the signal based on EUTRA and the signal based on D2D communication is supported (A parameter reporting this is called 'commSimultaneousTx', and the UE may report that the simultaneous transmission is supported through this parameter.), and the D2D support band information per band combination 'commSupportedBandsPerBC' may also indicate bands on which the UE supports the simultaneous transmission of the signal based on EUTRA and the signal based on D2D communication for a specific band combination.

That is, the D2D support band information per band combination indicates, by default, bands (reception bands) on which the UE supports simultaneous reception of the signal based on EUTRA and the signal based on D2D communication, and if it is reported that the UE supports simultaneous transmission of the signal based on EUTRA and the signal based on D2D communication, indicates that the UE also supports simultaneous transmission of the signal based on EUTRA and the signal based on D2D communication on the reception bands.

The following table shows a specific example of UE-capability information described with reference to FIG. 15 to FIG. 17.

TABLE 7

```
-- ASN1START
UE-EUTRA-Capability ::=       SEQUENCE {
    accessStratumRelease          AccessStratumRelease,
    ue-Category                   INTEGER (1..5),
    pdcp-Parameters               PDCP-Parameters,
    phyLayerParameters            PhyLayerParameters,
    rf-Parameters                 RF-Parameters,
    measParameters                MeasParameters,
    ...
},
    nonCriticalExtension          UE-EUTRA-Capability-v920-IEs        OPTIONAL
}
RF-Parameters ::=             SEQUENCE {
    supportedBandListEUTRA        SupportedBandListEUTRA
}
...
SupportedBandCombination-r10 ::= SEQUENCE (SIZE (1..maxBandComb-r10)) OF
BandCombinationParameters-r10
SupportedBandCombination-v12xy ::= SEQUENCE (SIZE (1..maxBandComb-r10)) OF
BandCombinationParameters-v12xy
...
BandCombinationParameters-v12xy ::=    SEQUENCE {
    dc-Support-r12                     SEQUENCE {
        supported-r12                      SEQUENCE {
            asynchronous-r12                   ENUMERATED {supported}    OPTIONAL,
```

TABLE 7-continued

```
        supportedCellGrouping-r12           BIT STRING (SIZE (1..15))           OPTIONAL
    }                                                                          OPTIONAL
    },
    supportedNAICS-2CRS-AP-r12            BIT STRING (SIZE (1..maxNAICS-Entries-r12))   OPTIONAL,
    commSupportedBandsPerBC-r12                   BIT STRING (SIZE (1.. maxBands))      OPTIONAL,
    ...
}
...
Prose-Parameters-r12 ::=                  SEQUENCE {
    commSimultaneousTx-r12                     ENUMERATED {supported}   OPTIONAL,
    commSupportedBands-r12                     FreqBandIndicatorListEUTRA-r12   OPTIONAL,
    discSupportedBands-r12                     ProseSuppertedBandInfoList-r12   OPTIONAL,
    discScheduledResourceAlloc-r12             ENUMERATED {supported}   OPTIONAL,
    disc-UE-SelectedResourceAlloc-r12          ENUMERATED {supported}   OPTIONAL,
    disc-SLSS-r12                              ENUMERATED {supported}   OPTIONAL,
    discSupportedProc-r12                      ENUMERATED {n50, n400}   OPTIONAL
}
ProseSupportedBandInfoList-r12 ::=        SEQUENCE (SIZE (1..maxBands)) OF
ProseSupportedBandInfo-r12
ProseSupportedBandInfo-r12 ::=            SEQUENCE {
    support-r12                                ENUMERATED {supported} OPTIONAL
}
FreqBandIndicatorListEUTRA-r12 ::=        SEQUENCE (SIZE (1..maxBands)) OF
                                          FreqBandIndicator-r11
```

Referring to Table 7 above, the UE-capability information includes a plurality of pieces of information included in the conventional UE-capability information such as a UE category 'ue-Category', a physical layer parameter 'phyLayerParamters', a radio frequency parameter 'rf-parameters', or the like. The radio frequency parameter includes 'supportedBandListEUTRA' which indicates bands (EUTRA bands) supporting cellular communication.

Meanwhile, the UE-capability information includes additional parameters according to the present invention. The additional parameters are related to the D2D operation, and include the aforementioned D2D band information and D2D support band information per band combination.

In Table 7 above, the D2D band information may be, for example, 'commSupportedBands' and 'discSupportedBands'.

'commSupportedBands' indicates bands on which the UE supports D2D communication. If 'commSupportedBands' indicates a plurality of bands, the plurality of bands may configure a band combination. 'commSupportedBands' may be provided in a bitmap format. Bits of a bitmap constituting 'commSupportedBands' may correspond to respective bands included in 'supportedBandListEUTRA'. That is, a first bit of the bitmap constituting 'commSupportedBands' may correspond to a first band included in 'supportedBandListEUTRA'. If a value of a specific bit is 1 in the bitmap constituting 'commSupportedBands', it may indicate that a corresponding band in 'supportedBandListEUTRA' is a band supporting D2D communication. Alternatively, 'commSupportedBands' may be provided as a separate list in addition to 'supportedBandListEUTRA'.

'discSupportedBands' indicates bands on which the UE supports D2D discovery. 'discSupportedBands' may be provided in a form of a list including bands supporting an operation for D2D discovery.

That is, as shown in Table 7 above, the D2D band information may report each of a band on which the UE supports D2D communication and a band on which the UE supports D2D discovery.

In Table 7 above, the D2D support band information per band combination may be 'commSupportedBandsPerBC'. 'commSupportedBandsPerBC' indicates bands on which the UE supports simultaneous reception of a signal based on EUTRA and a signal based on D2D communication with respect to a specific band combination (BC). If the UE supports simultaneous transmission of the signal based on EUTRA and the signal based on D2D communication ('commSimultaneousTx' may report that the simultaneous transmission is supported, which will be described below), 'commSupportedBandsPerBC' may also indicate that the UE supports simultaneous transmission of the signal based on EUTRA and the signal based on D2D communication with respect to a specific BC. That is, although 'commSupportedBandsPerBC' indicates, by default, bands (reception bands) on which the UE supports simultaneous reception of the signal based on EUTRA and the signal based on D2D communication, if it is reported that the UE supports simultaneous transmission of the signal based on EUTRA and the signal based on D2D communication, it indicates that the UE also supports simultaneous transmission of the signal based on EUTRA and the signal based on D2D communication on the reception bands.

In Table 7 above, 'commSimultaneousTx' reports whether to support simultaneous transmission of a signal based on EUTRA and a signal based on D2D communication on all bands of a band combination for which it is reported that the UE supports the D2D operation.

Figure 18:
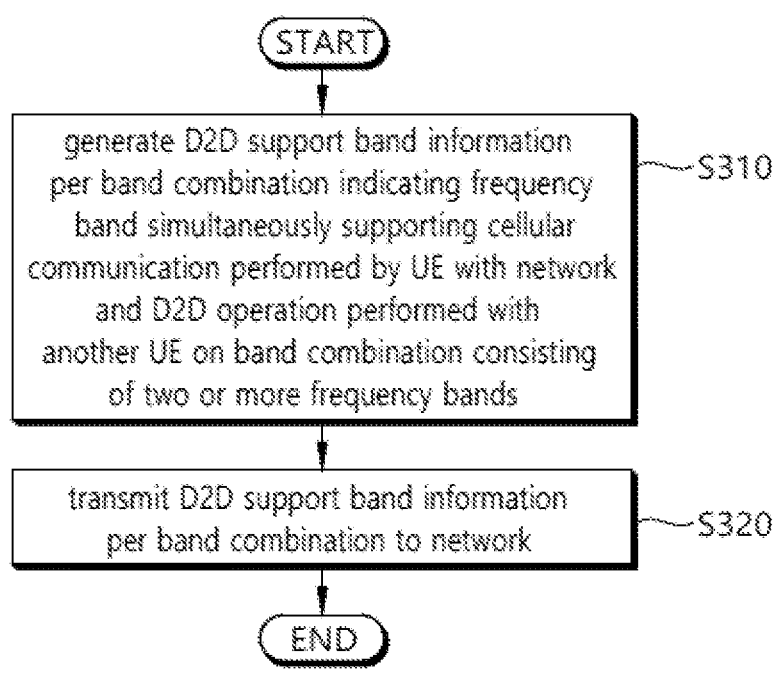
FIG. 18 shows a D2D operation method according to another embodiment of the present invention.

FIG. 18 shows a D2D operation method according to another embodiment of the present invention.

Referring to FIG. 18, a UE generates D2D support band information per band combination indicating a frequency band simultaneously supporting cellular communication performed by the UE with respect to a network and a D2D operation with another UE on a band combination consisting of two or more frequency bands (S310).

The UE transmits the D2D support band information per band combination to the network (S320).

Meanwhile, the UE may further include additional information in UE-capability information in addition to D2D band information and D2D support band information per band combination.

For example, regarding a band for a D2D operation, the UE may report whether a full duplex operation is supported between the band for the D2D operation and another band for a cellular operation.

Herein, the full duplex operation implies that the UE can accurately receive a D2D signal transmitted by another UE through a band A while the UE transmits a signal for the cellular communication through another band B between the signal band A for the D2D operation and the band B for the cellular operation.

The UE may report a band for cellular communication which is operable with full duplex for a specific band supporting the D2D operation. That is, a corresponding band for cellular communication which is operable with full duplex may be reported for each band supporting the D2D operation.

Alternatively, the UE may report whether a full duplex operation is supported for a first band for the D2D operation and a second band for the D2D operation. Herein, the first band and the second band are different from each other. For example, if the UE can receive a D2D communication signal transmitted by another UE on the band A while transmitting a signal for D2D communication on the band B, it can be regarded that the UE supports full duplex for the D2D operation on the bands A and B. In this case, the UE may provide the network with information reporting that the full duplex for the D2D operation is supported for the bands A and B.

Alternatively, the UE may report bands, on which the D2D operation can be performed with full duplex, to the network in a list form.

The UE may report to the network whether only half duplex is supported on the band for D2D operation and on the band for cellular communication. Herein, the half duplex is an operation in which, when the D2D operation is performed on a specific band, cellular communication is not supported on another band. On the other hand, this is an operation in which, when an operation based on cellular communication is performed on a specific band, the D2D operation is not supported on another band.

For example, during the UE transmits a signal for D2D communication on the band B, the UE cannot receive a signal based on cellular communication on the band A. This is because the signal for D2D communication on the band B has an effect on a receiver of the UE in which tuning is achieved with the band A. This is also called self-interference. That is, the UE supporting only the half duplex cannot simultaneously perform signal transmission on a specific band and signal reception on another band due to the self-interference.

The UE may need to report a band supporting the D2D operation with the half duplex together with the band for cellular communication. In the above example, when the band A is reported to the network, the UE reports to the network that the D2D operation is supported only in a half duplex manner on the band B.

The UE may report whether only the half duplex operation is supported for the first band for the D2D operation and the second band for the D2D operation. Herein, the first band and the second band are different from each other.

For example, if the UE cannot receive a D2D communication signal transmitted by another UE on the band A while the UE transmits a signal for D2D communication on the band B, it can be regarded that the UE supports only half duplex for the D2D operation on the bands A and B. Since the signal transmitted on the band B by the UE for D2D communication causes self-interference to the receiver of the UE in which tuning is achieved with the band A, the UE cannot receive a D2D communication signal transmitted by another UE on the band A.

In this case, the UE may provide the network with information reporting that the full duplex for the D2D operation is supported for the bands A and B. In the above example, when the band A supporting the D2D operation is reported to the network, the UE may report to the network that the D2D operation is supported only in the half duplex manner on the band B (on the contrary, apparently, when the band B supporting the D2D operation is reported to the network, it may be reported that the D2D operation is supported only in the half duplex manner on the band A).

Although it is described above that the UE explicitly reports the duplex scheme supported by the UE by means of UE-capability information, the present invention is not limited thereto. That is, the duplex scheme supported by the UE may not be explicitly reported by means of the UE-capability information.

As such, when the information regarding the supported duplex scheme is not explicitly included in the UE-capability information, the network may regard that full duplex is supported for all band combinations reported by the UE or regard that half duplex is supported. For example, as long as the UE-capability information does not have information explicitly indicating that only half duplex is supported for a specific band combination, the network may regard that full duplex is supported for all the remaining band combinations except for the specific band combination among the band combinations reported by the UE (or as long as the UE-capability information does not have information explicitly indicating that only full duplex is supported for the specific band combination, the network may regard that half duplex is supported for all the remaining band combinations except for the specific band combination among the band combinations reported by the UE).

Figure 19:
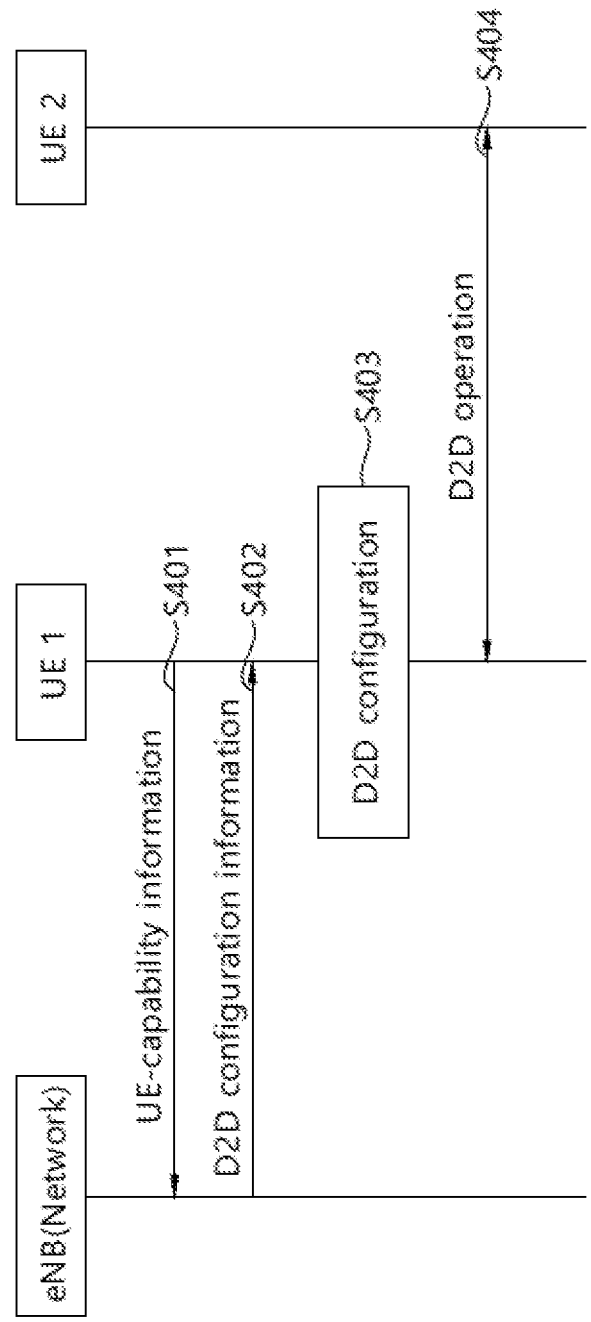
FIG. 19 shows a D2D operation method of a UE according to the present invention.

FIG. 19 shows a D2D operation method of a UE according to the present invention.

Referring to FIG. 19, a UE 1 provides a network with UE-capability information (S401). The UE-capability information may include the aforementioned D2D band information and D2D support band information per band combination.

The network provides the UE 1 with D2D configuration information (S402). Since the network can know a D2D band supported by the UE 1 on the basis of the UE-capability information, a band suitable for the UE 1 may be configured for the D2D operation. When the network provides the UE 1 with D2D configuration information, a procedure (e.g., a handover, or a secondary cell replacement, etc.) may be performed to move a serving frequency of the UE to another band according to the UE-capability information.

The UE 1 performs a D2D configuration on the basis of the D2D configuration information (S403).

The UE 1 performs the D2D operation with respect to a UE 2 (S404). Although not shown in FIG. 19, the UE 2 may also exchange the UE-capability information and the D2D configuration information with respect to the network before the D2D operation is performed.

The network may configure a resource usable in the D2D operation to the UE. If the UE can perform the D2D operation on a current serving frequency (a primary frequency), the network configures the resource usable in the D2D operation on the primary frequency.

However, the UE may perform the D2D operation not on the primary frequency but on another frequency according to its capability. In this case, the network must also indicate a frequency on which the resource is usable while reporting a resource usable in the D2D operation. Otherwise, the UE may cannot know to which frequency the resource is applied.

Accordingly, the present invention proposes that, when the network configures the resource usable in the D2D operation to the UE, a frequency on which the resource is usable is also reported.

If a resource usable in the D2D operation (hereinafter, a D2D resource) is for a primary frequency of the UE, the network may omit information indicating a frequency on which the D2D resource is usable. On the other hand, if the frequency on which the D2D resource is usable is not the primary frequency, the network cannot omit the information indicating the frequency on which the D2D resource is usable and must report a corresponding frequency. Hereinafter, information indicating the frequency on which the D2D resource is usable is called a frequency indicator.

In particular, if the UE can support a multi-carrier operation, the frequency indication may be provided necessarily. The multi-carrier operation implies that the UE can simultaneously receive signals (data) through a plurality of carriers or can simultaneously transmit signals (data).

Figure 20:
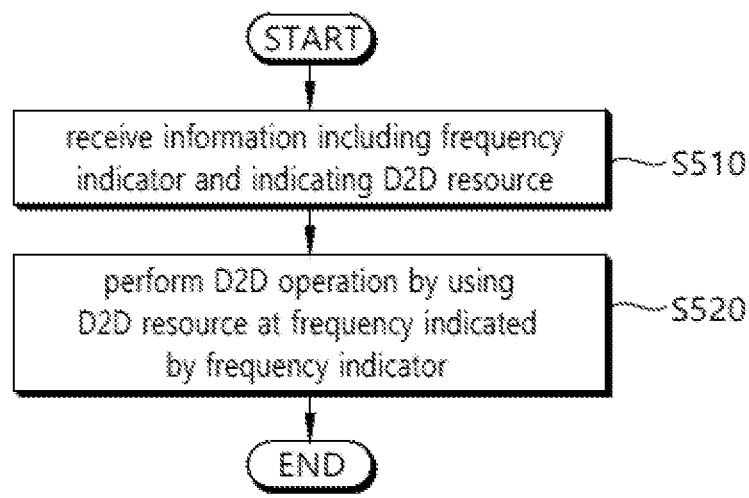
FIG. 20 shows a method of operating a UE according to an embodiment of the present invention.

FIG. 20 shows a method of operating a UE according to an embodiment of the present invention.

Referring to FIG. 20, the UE receives information including a frequency indicator and indicating a D2D resource (S510). The information indicating the D2D resource may be included in a D2D configuration.

The table below is an example of the information including the frequency indicator and indicating the D2D resource.

D2D signal. In general, a D2D configuration may include at least one of a D2D transmission configuration including resource information capable of transmitting the D2D signal on a frequency indicated by the frequency indicator and a D2D reception configuration including resource information capable of receiving the D2D signal. A resource capable of transmitting the D2D signal may be at least one resource pool. A resource capable of receiving the D2D signal may be at least one resource pool.

When a D2D transmission resource is selected on the frequency indicated by the frequency indicator, the D2D transmission configuration may indicate whether the D2D transmission resource is selected by an eNB or whether the D2D transmission resource is selected by the UE. That is, at which mode the D2D transmission resource is selected may be indicated between the mode 1 and the mode 2.

In addition, the information indicating the D2D resource may also include information indicating a frequency bandwidth on which the D2D resource is usable.

The D2D operation may be any one of D2D discovery and D2D communication. In Table 2 above, a D2D resource for D2D communication is shown for example.

A D2D configuration including the information indicating the D2D resource may be received through system information if the UE is in an RRC idle state or an RRC connected state, or may be received through a dedicated signal for the UE if the UE is in the RRC connected state.

The UE performs the D2D operation by using the D2D resource on a frequency indicated by the frequency indicator (S520). The UE may perform the D2D operation with

TABLE 8

```
-- ASN1START
SystemInformationBlockType18-r12 ::= SEQUENCE {
    commConfig-r12                  SEQUENCE {
        frequncyIndicator               SL-FrequencyIndication-r12
        commRxPool-r12                  SL-CommRxPoolList-r12,
        commTxPoolNormalCommon-r12      SL-CommTxPoolList-r12
        OPTIONAL, -- Need OR
        commTxPoolExceptional-r12       SL-CommTxPoolList-r12
        OPTIONAL, -- Need OR
        commSyncConfig-r12              SL-SyncConfigList-r12
        OPTIONAL                   -- Need OR
    }
                                                OPTIONAL, -- Need
OR
    lateNonCriticalExtension        OCTET STRING
                        OPTIONAL,
    ...
}
-- ASN1STOP
```

In the table above, 'frequencyIndicator' is a frequency indicator as a field indicating a frequency to which 'commConfig' is applied. In 'commSyncConfig', 'commRxPool' indicates a resource allowed to receive a signal regarding D2D communication in an RRC idle state and an RRC connected state. 'commTxPoolNormalCommon' indicates a resource allowed to transmit a signal regarding D2D communication on a frequency other than a specific frequency in the RRC idle state or the RRC connected state. 'commTxPoolExceptional' indicates a resource allowed to transmit a signal regarding D2D communication in an exceptional condition. That is, a network may report to the UE a D2D resource usable in a D2D operation and a frequency on which the D2D resource is usable.

The information indicating the D2D resource may indicate at least one of a resource that can be used to transmit the D2D signal and a resource that can be used to receive the respect to another UE on the basis of the D2D configuration including the information indicating the D2D resource.

Figure 21:
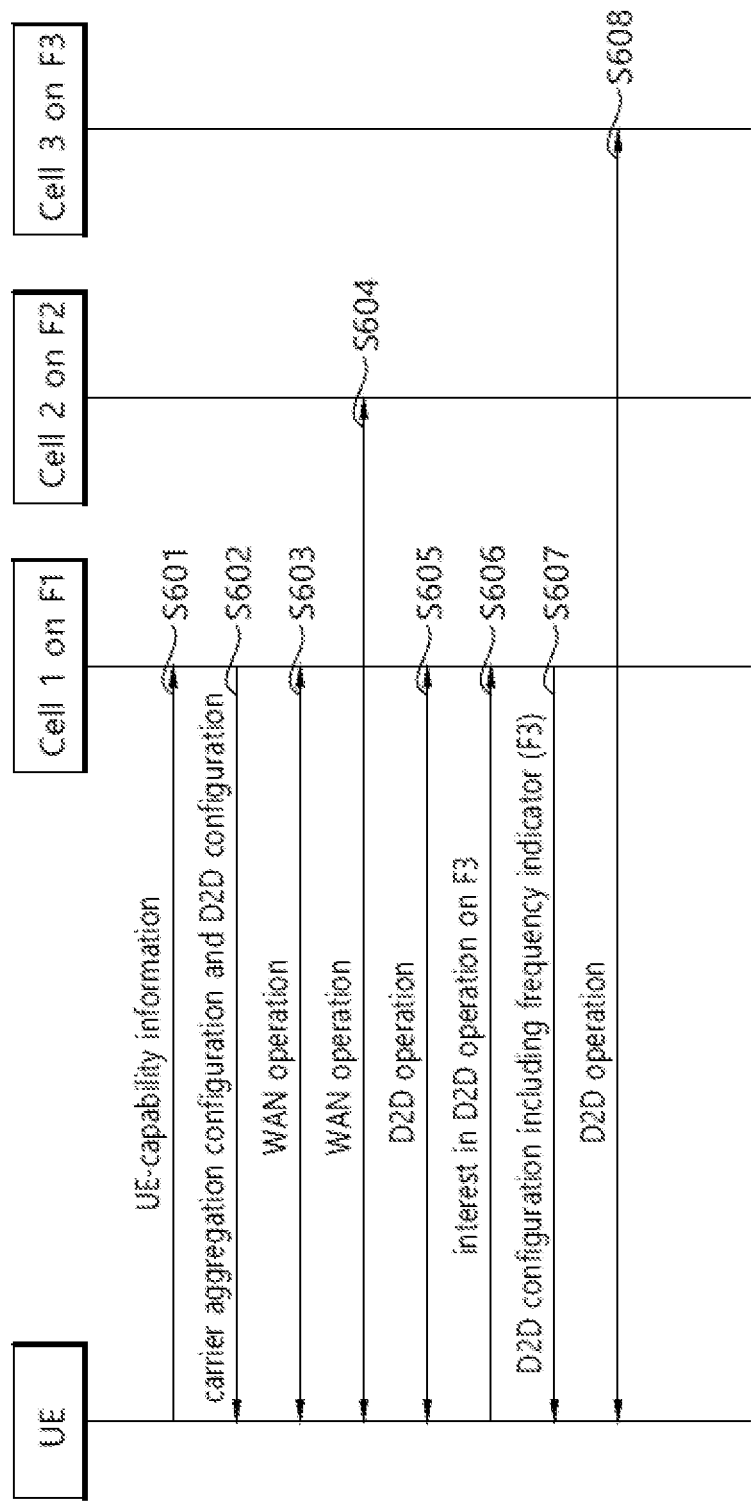
FIG. 21 shows an example of applying the method of FIG. 20 in detail.

FIG. 21 shows an example of applying the method of FIG. 20 in detail.

Referring to FIG. 21, a UE is in an RRC connected state with respect to a cell 1 of a frequency F1. The UE provides UE-capability information to the cell 1 (S601). The UE-capability information may include combination information of a carrier band supported by the UE and D2D capability information. The combination information of the carrier band may information indicating a combination of frequencies on which the UE supports a carrier aggregation. The D2D capability information may be information indicating a frequency on which the UE supports a D2D operation. The combination information of the carrier band and the D2D capability information may be combined and called 'D2D support band information per band combination'. That is, the UE may provide the cell 1 with the D2D support band information per band combination.

For example, the UE may provide the cell 1 with the D2D support band information per band combination indicating that: 1) a D2D operation is supported on F1 while supporting downlink (DL) on F1 and F2 and supporting uplink (UL) on F1; 2) the D2D operation is supported on F3 while supporting DL on F1 and F2 and supporting UL on F1; and 3) the D2D operation is supported on F2 while supporting DL on F2 and F3 and supporting UL on F2. In this case, the UE reports to the cell 1 that the D2D operation is supported on F1 or F3 while supporting a carrier aggregation on F1 and F2 or the D2D operation is supported on F2 while supporting carrier aggregation on F2 and F3.

The cell 1 provides the UE with a carrier aggregation configuration and a D2D configuration (S602). For example, on the basis of UE-capability information (D2D supported bane information per band combination), the cell 1 may configure F1 and F2 to the UE for the carrier aggregation, and may configure a D2D resource for a D2D operation on F1.

The UE may perform wide area network (WAN) communication with the cell 1 on F1 (S603), and may perform WAN communication with the cell 2 on F2 (S604). That is, the UE may perform an operation based on the carrier aggregation on F1 and F2.

Further, the UE performs the D2D operation on F1 (S605). The UE may perform the D2D operation on the basis of the D2D configuration received from the cell 1.

The UE may need to perform the D2D operation on F3. In this case, the UE reports to the cell 1 that it is interested in the D2D operation on F3 (S606). That is, the UE may request a current serving cell to provide a D2D configuration for a D2D operation on another frequency (or another cell).

The cell 1 provides the UE with a D2D configuration including a frequency indicator (indicating F3) (S607). That is, the cell 1 may provide a D2D configuration for a frequency (or cell) requested by the UE.

Since the frequency indicator indicates F3, the UE may know that the D2D configuration is for F3. Therefore, the D2D operation is performed by using the D2D configuration on F3 (S608).

Meanwhile, although not shown in FIG. 21, it is assumed a case where the UE reports to the cell 1 that it is interested in the D2D operation on F2. Since F1 and F2 are used in DL and F1 is used in UL in a current carrier aggregation, UL is not supported on F2. Since the D2D operation is performed on a UL frequency, the UE cannot perform the D2D operation on F2 in a current carrier aggregation situation. In this case, the cell 1 may configure F2 and F3 for a carrier aggregation (that is, F2 and F3 are configured for DL, and F2 is configured for UL) while a handover to the cell 2 is performed on the UE, and may configure a D2D resource for the D2D operation on F2. Then, since the F2 is configured as a UL frequency, the UE may perform the D2D operation on F2.

If a carrier aggregation is not configured to a UE which is in an RRC connected state with respect to a cell of a first frequency, the UE may receive from the cell of the first frequency a D2D configuration applicable on a second frequency through a dedicated signal for the UE. In this case, the D2D configuration may include a frequency indicator indicating the second frequency.

It is assumed a case where a carrier aggregation (CA) in which cells of the first frequency and the second frequency are allocated is configured for the UE which is in the RRC connected state with respect to the cell of the first frequency. In this case, the UE may have the cell of the first frequency as a primary cell, and the cell of the second frequency as a secondary cell. The UE may be provided a D2D configuration to be applied to the second frequency from the cell of the first frequency, or may be provided a D2D configuration to be applied to the second frequency from the cell of the second frequency.

The UE in the RRC idle state may acquire a D2D configuration for a specific frequency through a signal to be broadcast.

Figure 22:
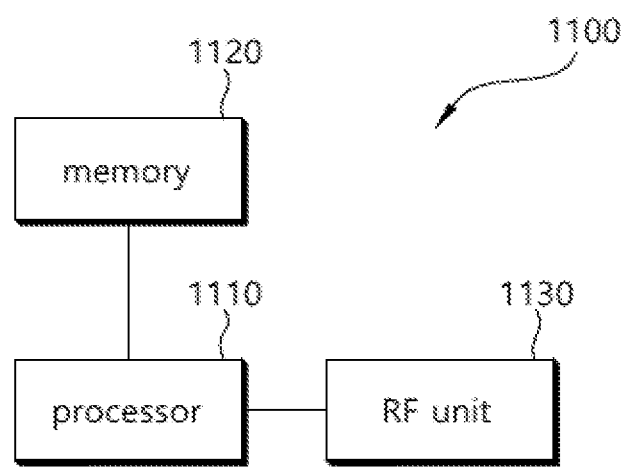
FIG. 22 is a block diagram showing a UE according to an embodiment of the present invention.

FIG. 22 is a block diagram showing a UE according to an embodiment of the present invention.

Referring to FIG. 22, a UE 1100 includes a processor 1110, a memory 1120, and radio frequency (RF) unit 1130. The processor 1110 implements the proposed functions, procedures, and/or methods. For example, the processor 1110 may receive a D2D configuration from a cell, and the D2D configuration may include a frequency indicator indicating a frequency on which the UE performs a D2D operation according to the D2D configuration.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing device-to-device (D2D) operation in a wireless communication system, the method performed by a user equipment (UE) and comprising:
   receiving, from a base station, frequency information for the D2D operation; and
   performing the D2D operation based on the frequency information,
   wherein the frequency information includes a specific frequency on which the D2D operation is supported,
   wherein the specific frequency is a frequency different from a current frequency of the UE, and
   wherein the UE transmits, to the base station, band information including a frequency band on which the UE supports the D2D operation.

2. The method of claim 1, wherein the D2D operation includes at least one of a D2D discovery or a D2D communication.

3. The method of claim 1, wherein the UE receives the frequency information based on system information.

4. The method of claim 3, wherein the system information is broadcasted.

5. A user equipment (UE) for device-to-device (D2D) operation in a wireless communication system, the UE comprising:
   a transceiver; and
   a processor operatively coupled to the transceiver,
   wherein the processor:
   controls the transceiver to receive, from a base station, frequency information for the D2D operation; and perform the D2D operation based on the frequency information, wherein the frequency information includes a specific frequency on which the D2D operation is supported, wherein the specific frequency is a frequency different from a current frequency of the UE, and wherein the UE transmits, to the base station, band information including a frequency band on which the UE supports the D2D operation.

6. The UE of claim 5, wherein the D2D operation includes at least one of a D2D discovery or a D2D communication.

7. The UE of claim 5, wherein the UE receives the frequency information based on system information.

8. The UE of claim 7, wherein the system information is broadcasted.

* * * * *